US008719852B2

(12) United States Patent
Nakanishi et al.

(10) Patent No.: US 8,719,852 B2
(45) Date of Patent: May 6, 2014

(54) TURNTABLE FOR STORAGE DISK DRIVE APPARATUS, A MOTOR INCLUDING THE TURNTABLE, A STORAGE DISK DRIVE APPARATUS INCLUDING THE TURNTABLE, AND A METHOD FOR MANUFACTURING THE TURNTABLE

(75) Inventors: Kosuke Nakanishi, Kyoto (JP); Shinya Tabata, Kyoto (JP); Toshihide Sonoda, Kyoto (JP); Yoshihisa Kitamura, Kyoto (JP); Takuya Yamane, Kyoto (JP); Kenta Miyoshi, Kyoto (JP)

(73) Assignee: Nidec Corporation, Kyoto (JP)

( * ) Notice: Subject to any disclaimer, the term of this patent is extended or adjusted under 35 U.S.C. 154(b) by 570 days.

(21) Appl. No.: 12/842,275

(22) Filed: Jul. 23, 2010

(65) Prior Publication Data
US 2011/0035763 A1 Feb. 10, 2011

(30) Foreign Application Priority Data

Aug. 7, 2009 (JP) .................................. 2009-184122
Apr. 26, 2010 (JP) .................................. 2010-100956

(51) Int. Cl.
*G11B 17/028* (2006.01)

(52) U.S. Cl.
USPC .......................................................... 720/707

(58) Field of Classification Search
USPC .................................. 720/695–717, 721–724
See application file for complete search history.

(56) References Cited

U.S. PATENT DOCUMENTS

| 6,549,508 B1* | 4/2003 | Matsumoto et al. ........... 369/264 |
| 7,002,268 B2* | 2/2006 | Nagatsuka .................. 360/99.08 |
| 2002/0150029 A1* | 10/2002 | Ezawa et al. .................... 369/271 |
| 2008/0002288 A1* | 1/2008 | Takaki et al. .................. 720/695 |
| 2008/0127239 A1* | 5/2008 | Matsuda et al. ............... 720/695 |
| 2009/0064212 A1* | 3/2009 | Ito et al. ......................... 720/604 |
| 2010/0309588 A1 | 12/2010 | Nakanishi et al. |
| 2010/0313212 A1 | 12/2010 | Nakanishi et al. |

FOREIGN PATENT DOCUMENTS

| CN | 101097751 A | 1/2008 |
| JP | 3-048761 Y2 | 10/1991 |
| JP | 2000-113544 A | 4/2000 |
| JP | 2001-037141 A | 2/2001 |
| JP | 2004-146056 A | 5/2004 |
| JP | 2008-10071 A | 1/2008 |
| JP | 2008-130208 A | 6/2008 |
| JP | 2008-135129 A | 6/2008 |

* cited by examiner

*Primary Examiner* — Nathan Danielsen
(74) *Attorney, Agent, or Firm* — Westerman, Hattori, Daniels & Adrian, LLP

(57) ABSTRACT

A turntable for storage disk drive apparatuses includes a plate member made of a ferromagnetic material and a central resin member arranged at the center of the plate member and formed by injection-molding a resin. The central resin member includes a disk guide portion provided on an upper surface thereof to guide a central hole of a disk and a plurality of gate recess portions indented upwards from a lower surface of the central resin member. The gate recess portions include ceiling surfaces positioned higher than the plate member. The ceiling surfaces include a plurality of gate cut portions formed in an injection molding process.

19 Claims, 27 Drawing Sheets

TURNTABLE FOR STORAGE DISK DRIVE APPARATUS, A MOTOR INCLUDING THE TURNTABLE, A STORAGE DISK DRIVE APPARATUS INCLUDING THE TURNTABLE, AND A METHOD FOR MANUFACTURING THE TURNTABLE

BACKGROUND OF THE INVENTION

1. Field of the Invention

The present invention relates to a storage disk turntable, a motor and a storage disk drive apparatus.

2. Description of the Related Art

In a conventional storage disk drive apparatus, a motor is provided with a turntable for holding a storage disk. Japanese Utility Model No. H3-48761 discloses a turntable including a turntable body and a center spindle. The turntable body is made of a magnetic material. The center spindle is made of a resin and integrally formed with the turntable body into a single member. A tapering peripheral surface whose diameter gets gradually reduced upwards is defined in the center spindle. On the tapering peripheral surface, disk rest pieces are provided at an equal interval along a circumferential direction. When a disk with a central hole is mounted on the turntable, the disk rest pieces make contact with the edge portion of the central hole of the disk and undergo elastic deformation, thereby centering the disk with respect to the turntable body.

SUMMARY OF THE INVENTION

In accordance with a first preferred embodiment of the present invention, there is provided a turntable for storage disk drive apparatuses, including: a plate member made of a ferromagnetic material; and a central resin member arranged at the center of the plate member and formed by injection-molding a resin, wherein the central resin member includes a disk guide portion provided on an upper surface thereof to guide a central hole of a disk and a plurality of gate recess portions indented upwards from a lower surface of the central resin member, the gate recess portions including ceiling surfaces positioned higher than the plate member, the ceiling surfaces including a plurality of gate cut portions formed in an injection molding process.

In accordance with a second preferred embodiment of the present invention, there is provided a turntable for storage disk drive apparatuses, including: a plate member made of a ferromagnetic material; and a central resin member arranged at the center of the plate member and formed by injection-molding a resin, wherein the central resin member includes a disk guide portion provided on an upper surface of the central resin member to guide a central hole of a disk and a plurality of gate cut portions formed on a lower surface of the central resin member, and the plate member includes hole portions or cutout portions formed at the positions overlapping with the gate cut portions in the direction parallel or substantially parallel to the center axis.

In accordance with a third preferred embodiment of the present invention, there is provided a method for manufacturing a turntable for storage disk drive apparatuses, which includes the steps of: a) attaching a plate member made a ferromagnetic material to a movable mold or a fixed mold in a posture perpendicular or substantially perpendicular to the moving direction of the movable mold; b) defining a cavity between the movable mold and the fixed mold by clamping the movable mold and the fixed mold together; and c) forming a central resin member at the center of the plate member by injecting a resin into the cavity from a gate provided in one of the movable mold and the fixed mold, wherein the position of the mold in which the gate is provided corresponds to the lower side of the central resin member while the position of the other mold corresponds to the upper side of the central resin member; the central resin member includes a disk guide portion formed on an upper surface thereof to guide a central hole of a disk; the mold in which the gate is provided includes a protrusion portion protruding toward the other mold in the direction parallel or substantially parallel to the moving direction of the movable mold, the gate being provided at the tip end of the protrusion portion, the tip end of the protrusion portion passing through a center hole of the plate member in step b).

With the present invention, it is possible to suppress occurrence of resin sinkage in the upper portion of a central resin member having a disk guide portion.

Other features, elements, steps, characteristics and advantages of the present invention will become more apparent from the following detailed description of preferred embodiments of the present invention with reference to the attached drawings.

DETAILED DESCRIPTION OF THE INVENTION

In the subject specification, the upper side along a center axis J1 will be just referred to as "upper" and the lower side as "lower". The terms "upper", "lower", "left" and "right" used herein to describe the positional relationship or direction of the respective members are based on the drawings but are not intended to designate the positional relationship or direction when built in actual devices.

(First Preferred Embodiment)

Figure 1:
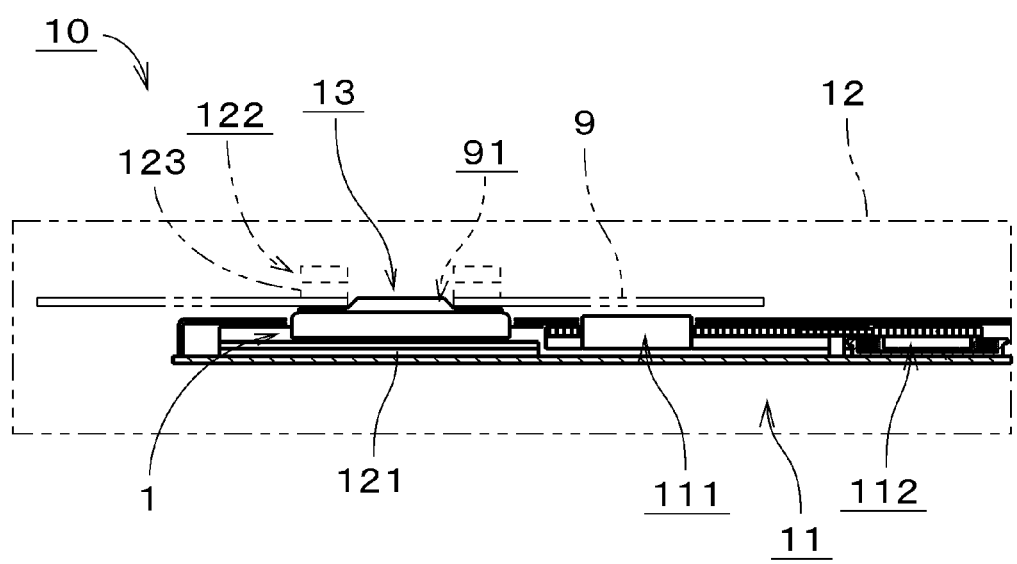
FIG. 1 is a section view showing a storage disk drive apparatus according to a first preferred embodiment.

FIG. 1 is a section view showing a storage disk drive apparatus 10 provided with a motor according to a first preferred embodiment of the present invention. The storage disk drive apparatus 10 preferably includes a motor 1, an access unit 11 and a box-like housing 12 arranged to accommodate the motor 1 and the access unit 11 therein. In FIG. 1, the housing 12, a clamper 122, a clamp magnet 123 and a storage disk 9 are indicated by double-dot chain lines. The motor 1 is held in place by a chassis 121. The access unit 11 preferably includes a head 111 and a head moving mechanism 112.

The head 111 is an optical pickup mechanism designed to perform a task of reading information from the storage disk 9 and/or a task of writing information on the storage disk 9. Examples of the storage disk 9 include a Blu-ray disc. The head moving mechanism 112 serves to move the head 111 with respect to the motor 1 and the storage disk 9. The head 111 preferably includes a light-emitting portion and a light-receiving portion. The light-emitting portion is designed to emit laser light toward the lower surface of the storage disk 9. The light-receiving portion is configured to receive the light reflected from the storage disk 9.

A transfer mechanism not shown in the drawings is provided in the housing 12. The storage disk 9 is inserted into or taken out of the housing 12 by the transfer mechanism. Furthermore, a clamper 122 having a clamp magnet 123 is provided in the housing 12.

If the storage disk 9 is inserted into the housing 12, the central hole 91 of the storage disk 9 is positioned above the turntable 13 of the motor 1. Then, the motor 1 is moved upwards to mount the storage disk 9 on the turntable 13. The clamp magnet 123 attracts the metallic plate member of the turntable 13 from above, whereby the storage disk 9 is clamped on the turntable 13 by the clamper 122.

In the storage disk drive apparatus 10, the storage disk 9 is rotated by the motor 1 and the head 111 is moved to a desired position by the head moving mechanism 112 so that the head 111 can perform a task of reading information from the storage disk 9 and/or a task of writing information on the storage disk 9. When the storage disk 9 is taken out of the housing 12, the clamper 122 is moved away from the storage disk 9 and the motor 1 is moved downwards, thereby allowing the storage disk 9 to be removed from the turntable 13.

Figure 2:
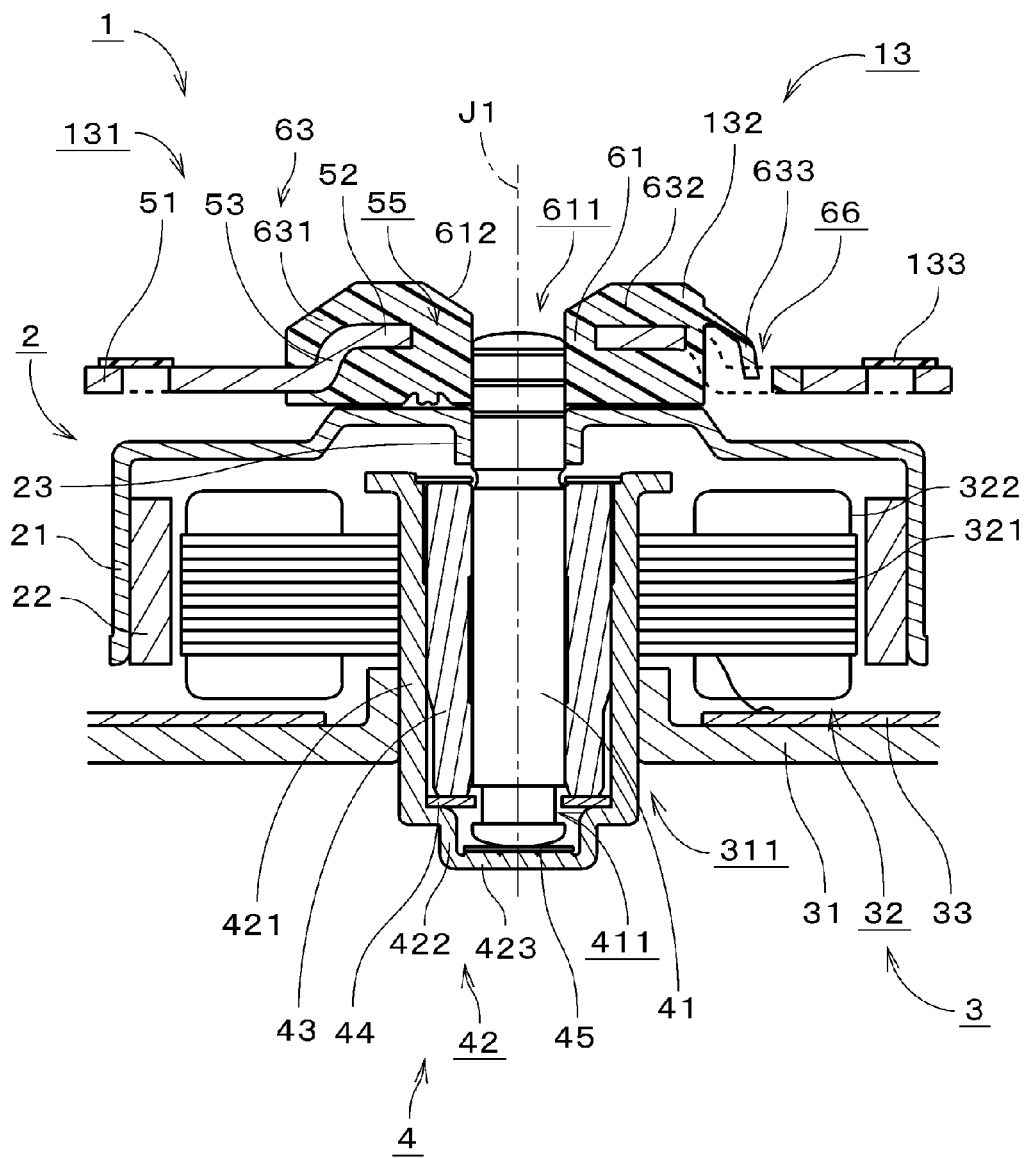
FIG. 2 is a section view showing a motor.

FIG. 2 is a vertical section view of the motor 1. As shown, the motor 1 preferably includes a rotary unit as a rotating assembly, a stationary unit 3 as a fixed assembly, a turntable 13 and a bearing mechanism 4. The rotary unit 2 is supported above the stationary unit 3 by the bearing mechanism 4 so that the rotary unit 2 can rotate with respect to the stationary unit 3. The turntable 13 is provided at the upper end of the rotary unit 2.

The rotary unit 2 preferably includes a substantially cylindrical cup member 21 with the top and an annular rotor magnet 22. The rotor magnet 22 is attached to the inner surface of the cylinder portion of the cup member 21. A substantially cylindrical shaft-fixing portion 23 is provided in the center of the cup member 21.

The stationary unit 3 preferably includes a substantially flat base portion 31, a stator 32 and a circuit board 33. The circuit board 33 is arranged on the base portion 31. The base portion 31 is made of metal and has a central hole 311 to which the bearing mechanism 4 is attached. The stator 32 preferably includes a stator core 321 and a plurality of coils 322 wound around the stator core 321. The stator core 321 is formed of laminated steel plates. The stator 32 is opposed to the rotor magnet 22 in the direction perpendicular or substantially perpendicular to the center axis J1. When the motor 1 is driven, a magnetic interaction occurs between the rotor magnet 22 and the stator 32.

The bearing mechanism 4 preferably includes a shaft 41, a substantially cylindrical sleeve retainer 42 with the bottom, a sleeve 43 and a substantially annular removal-preventing member 44. An annular groove 411 is formed in the lower end portion of the shaft 41. The upper end portion of the shaft 41 is inserted into the shaft-fixing portion 23 and fixed to the cup member 21. The sleeve 43 is made from an oil-containing porous metallic body. The sleeve retainer 42 preferably includes a cylinder portion 421, an annular step portion 422 and a bottom portion 423. The diameter of the step portion 422 is reduced from the lower end of the cylinder portion 421 toward the center axis J1. The bottom portion 423 is formed at the lower side of the step portion 422 to close the lower end of the sleeve retainer 42. The stator 32 is attached to the outer surface of the cylinder portion 421.

The removal-preventing member 44 is made of an elastic material such as a resin or the like and is placed on the step portion 422. The inner end portion of the removal-preventing member 44 is positioned within the groove 411 of the shaft 41, thereby preventing the shaft 41 from being removed out of the sleeve retainer 42. A disc-shaped thrust plate 45 is provided inside the bottom portion 423. During the operation of the motor 1, the tip end of the shaft 41 bears against the thrust plate 45 so that the shaft can be stably supported in the axial direction. In addition, the shaft 41 is radially supported by the sleeve 43 with oil interposed therebetween.

The turntable 13 preferably includes a disc-shaped plate member 131, an annular central resin member 132 and an annular rubber member 133. In FIG. 2, the inner portion of the plate member 131 is partially indicated by a broken line. The plate member 131 is made of a soft ferromagnetic material, e.g., electrogalvanized steel plate (SECC), and formed into a desired shape by a press work. The thickness of the plate member 131 is equal to about 0.8 mm. The central resin member 132 is formed by injection-molding polycarbonate (PC) or the like. Thus, the plate member 131 and the central resin member 132 are formed into a single component part.

The plate member 131 preferably includes a peripheral plate portion 51, a central plate portion 52 and a bent portion 53 lying between the peripheral plate portion 51 and the central plate portion 52. The peripheral plate portion 51 is substantially perpendicular or substantially perpendicular to the center axis J1. The central plate portion 52 is substantially perpendicular to the center axis J1 and positioned higher than the peripheral plate portion 51. In the turntable 13, a great enough magnetic interaction can be caused to occur between the clamp magnet 123 shown in FIG. 1 and the peripheral plate portion 51 of the plate member 131. Therefore, the plate member 131 may be made of a soft ferromagnetic material and can be selected from low-priced materials. This makes it possible to manufacture the turntable 13 in a cost-effective manner.

Figure 3:
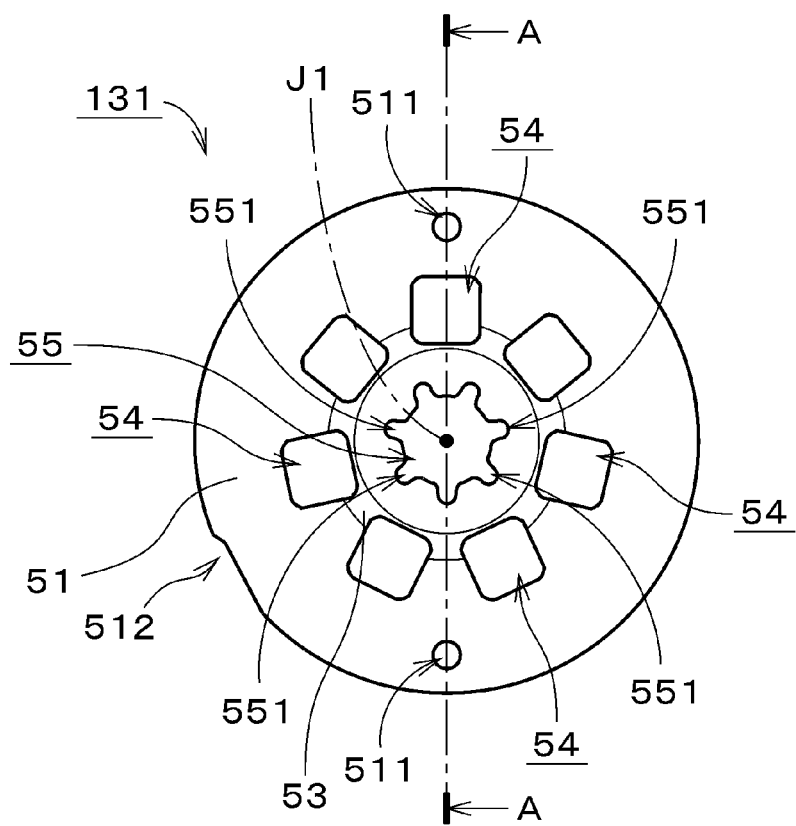
FIG. 3 is a plan view showing a plate member.
Figure 4:
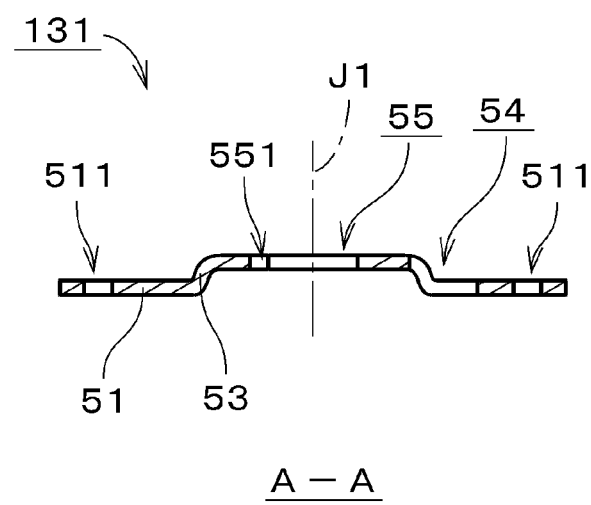
FIG. 4 is a section view of the plate member.

FIG. 3 is a top view of the plate member 131. FIG. 4 is a section view of the plate member 131 taken along line A-A in FIG. 3. As shown in FIGS. 3 and 4, seven openings 54 are circumferentially formed about the center axis J1 in the plate member 131 by punching the peripheral plate portion 51 and the bent portion 53 at seven points. A plate center hole 55 is formed substantially at the center of the plate member 131. Seven cutouts 551 extending radially outwards from the plate center hole 55 are defined in the plate center hole 55 in a concentric relationship with the center axis J1. Two minute holes 511 are formed in the peripheral plate portion 51. As shown in FIG. 3, an additional cutout 512 is formed in the outer edge of the plate member 131.

As can be seen in FIG. 2, the central resin member 132 is arranged substantially at the center of the plate member 131 to protrude upwards beyond the peripheral plate portion 51. The central resin member 132 preferably includes a resinous cylinder portion 61, a disk guide portion 631, a resinous connector portion 632 and a plurality of claws 633. The central resin member 132 of this configuration is formed into a single member as a whole. The resinous cylinder portion 61 is positioned inside the plate center hole 55. In the resinous cylinder portion 61, there is formed a central resin through-hole 611 vertically extending through the center of the central resin member 132 and the center of the plate center hole 55. The central resin through-hole 611 has a central slanting surface 612 inclined radially inwards and downwards. The upper portion of the shaft 41 is fixed to the central resin through-hole 611. In the course of placing the clamper 122 (see FIG. 1) on the turntable 13, the guide portion (not shown) of the clamper 122 is inserted into the central resin through-hole 611 from above. Provision of the central slanting surface 612 makes it possible to readily insert the guide portion into the central resin through-hole 611.

The disk guide portion 631 is positioned in the upper outer peripheral portion of the central resin member 132 and inclined radially outwards and downwards about the center axis J1. The bent portion 53 of the plate member 131 is bent to substantially conform to the outer periphery shape of the disk guide portion 631. The resinous connector portion 632 is positioned above the central plate portion 52 to cover the entirety of the upper surface of the central plate portion 52 while interconnecting the resinous cylinder portion 61 and the disk guide portion 631. In the central resin member 132, the disk guide portion 631 and the resinous connector portion 632 cooperate to form an upper portion 63 positioned above the plate member 131.

Figure 5:
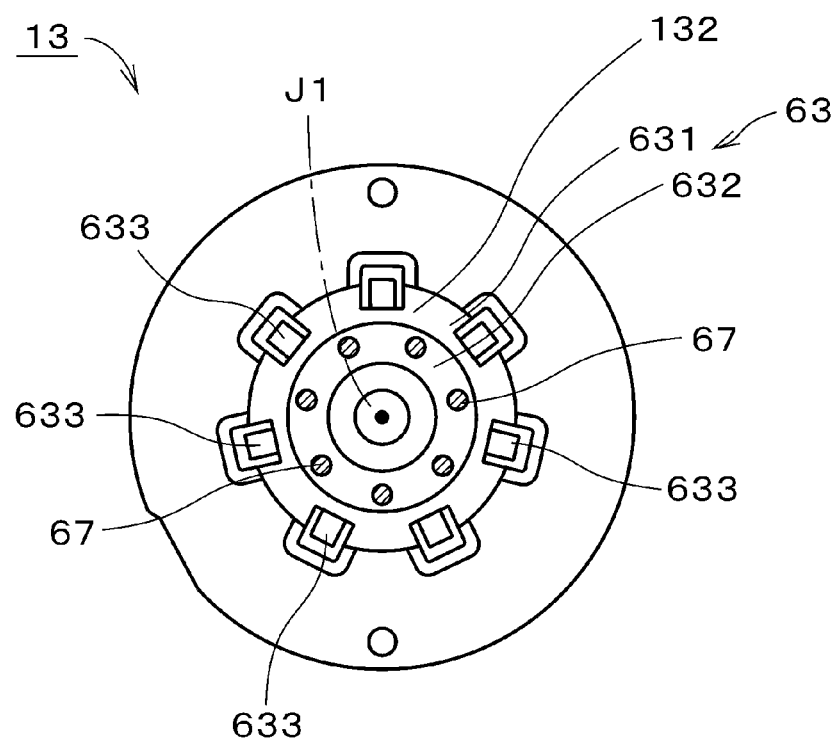
FIG. 5 is a plan view showing a turntable.
Figure 6:
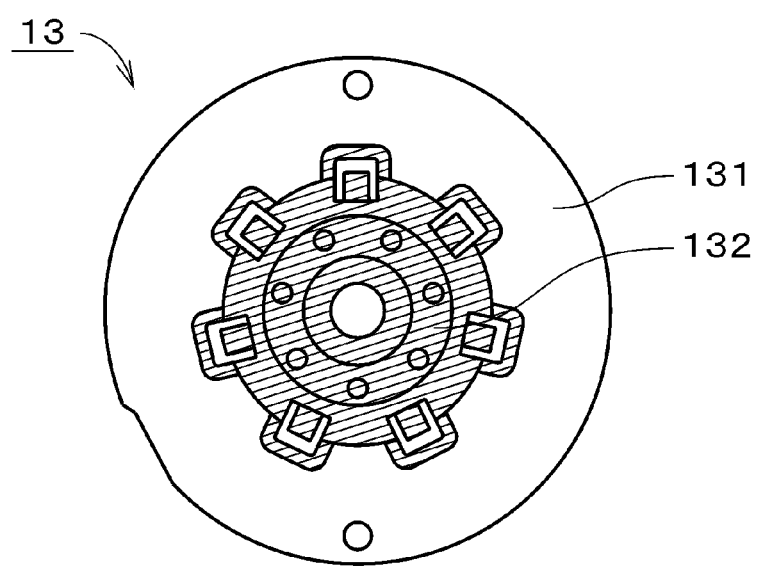
FIG. 6 is another plan view of the turntable.

FIGS. 5 and 6 are top views showing the turntable 13. In FIG. 5, the hatched portions 67 refer to the portions at which the below-mentioned release pins will press the resinous connector portion 632. In FIG. 6, the central resin member 132 is hatched for clear illustration.

As shown in FIG. 5, the claws 633 are formed at seven points of the disk guide portion 631, i.e., the outer peripheral portion of the upper portion 63. The claws 633 extend radially outwards and downwards from the disk guide portion 631 about the center axis J1. Referring back to FIG. 2, an undercut is formed between the disk guide portion 631 and each of the claws 633. In the following description, the radial direction with respect to the center axis J1 of the motor 1, i.e., the center axis of the central resin member 132, will be just referred to as "radial" and the circumferential direction as "circumferential".

Figure 7:
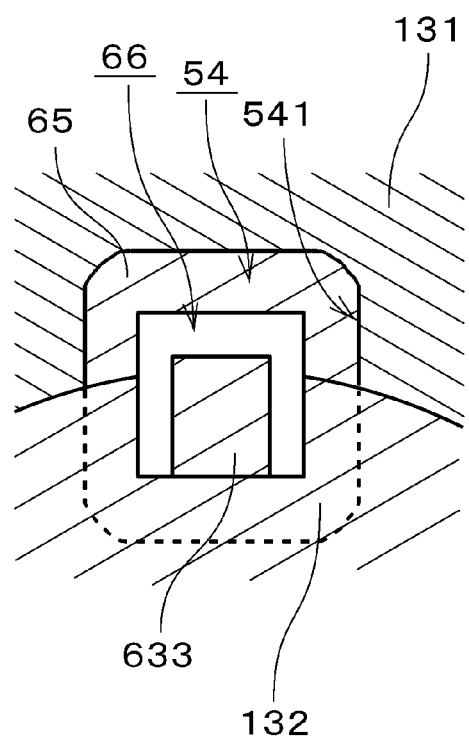
FIG. 7 is a view showing a claw on an enlarged scale.

FIG. 7 is an enlarged view of one of the claws 633 shown in FIG. 5 and its vicinities. The central resin member 132 is widely hatched and the plate member 131 is narrowly hatched in FIG. 7. The portion of the edge 541 of one of the openings 54 of the plate member 131, which is covered with the central resin member 132, is indicated by a broken line. The central resin member 132 is provided with a resin layer 65 formed in the edge 541 of each of the openings 54. A claw position hole 66 overlapping with each of the claws 633 in the direction parallel or substantially parallel to the center axis J1 is formed at the inner side of the resin layer 65. As shown in FIG. 2, the tip end of each of the claws 633 is positioned within the claw position hole 66.

When the storage disk 9 shown in FIG. 1 is attached to the turntable 13, the disk center hole 91 is guided toward the claws 633 by the disk guide portion 631. Thus, the claws 633 come into contact with the disk center hole 91. Consequently, the storage disk 9 is arranged on the plate member 131. More precisely, the storage disk 9 is mounted on the annular rubber member 133 in the plate member 131. In this state, the claws 633 are elastically deformed radially inwards while they are supported by the resinous connector portion 632. Use of the elastic deformation of the claws 633 makes it possible to accurately place the center of the storage disk 9 on the center axis J1. Thanks to this feature, a storage disk such as a Blu-ray disk, which requires high centering performance, can be attached to the turntable 13 with increased accuracy.

Figure 8:
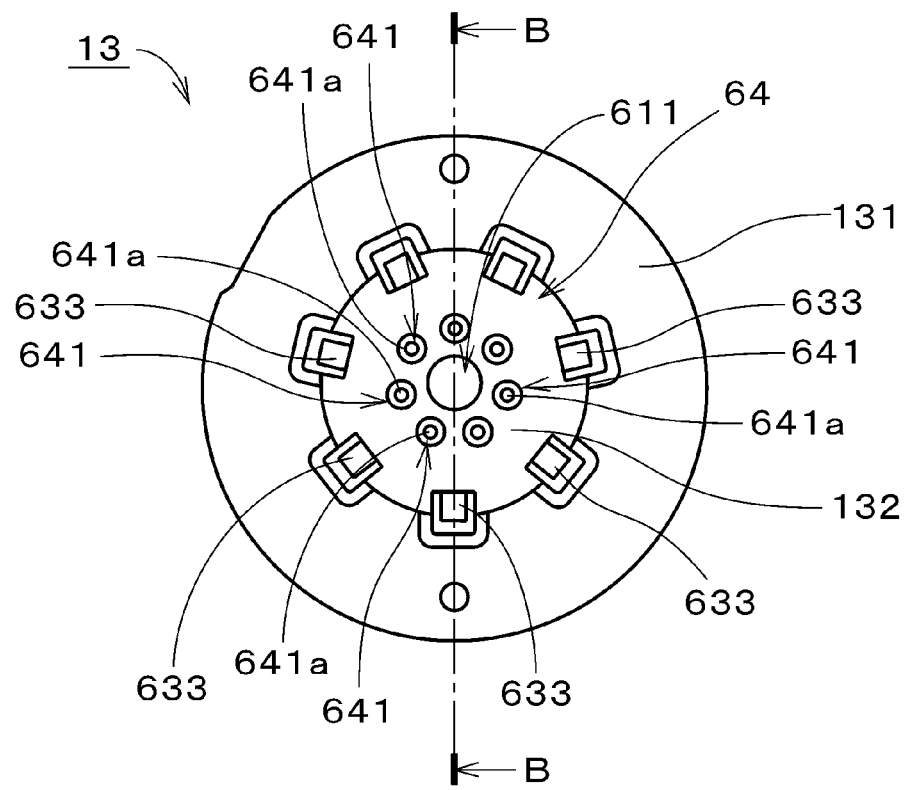
FIG. 8 is a bottom view of the turntable.
Figure 9:
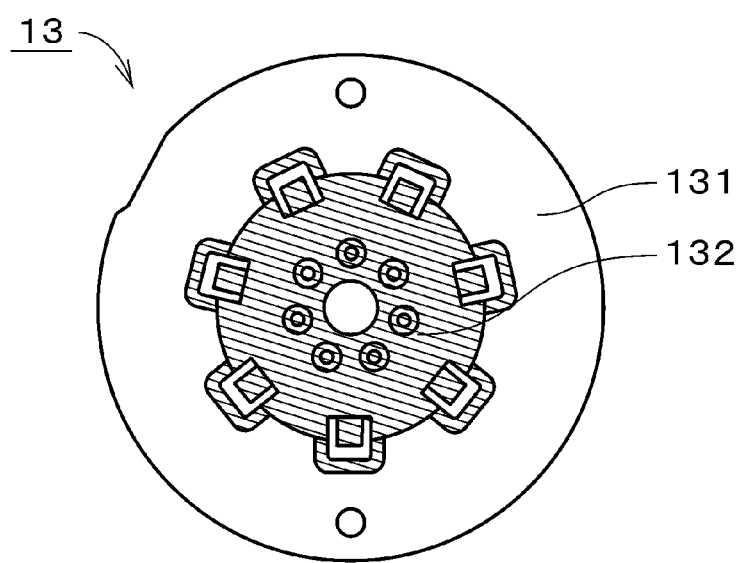
FIG. 9 is another bottom view of the turntable.
Figure 10:
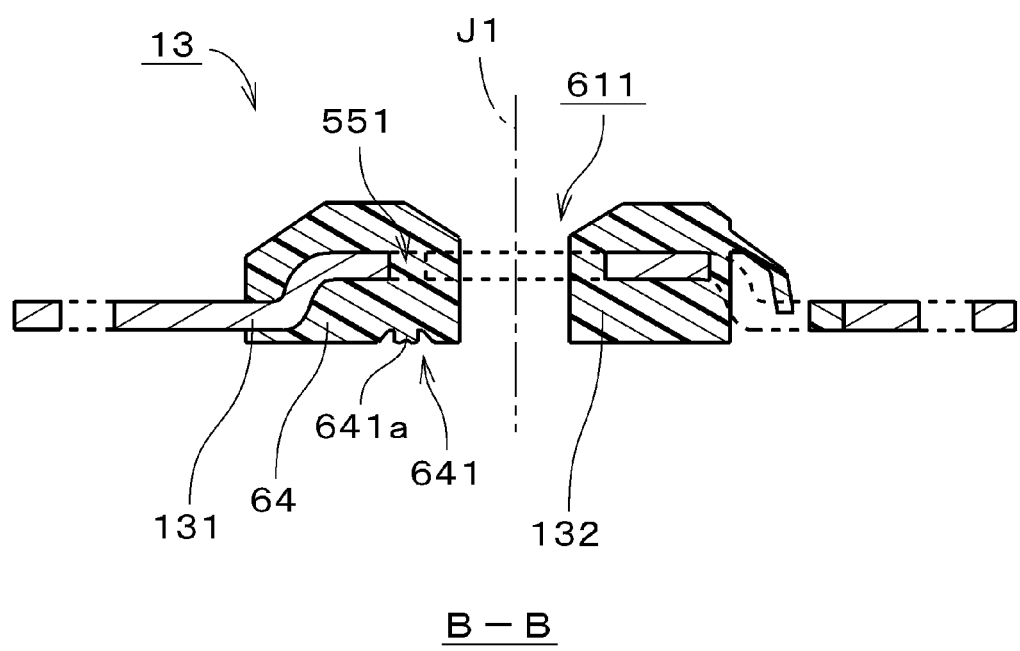
FIG. 10 is a section view of the turntable.

FIGS. 8 and 9 are bottom views of the turntable 13. The central resin member 132 is hatched in FIG. 9. FIG. 10 is a section view of the turntable 13 taken along line B-B in FIG. 8. The inner shape of the plate member 131 is indicated by a broken line in FIG. 10. This holds true in FIGS. 12 and 13. As shown in FIGS. 8 and 10, seven upwardly-indented minute recess portions 641 are formed at an equal circumferential interval in the lower portion 64 of the central resin member 132 around the central resin through-hole 611.

As will be set forth below, when injection-molding the central resin member 132, a resin is injected into the cavity of a mold through the gates formed in a corresponding relationship with the recess portions 641. The resin is severed at the gates when a molded product is removed from the mold. This leaves gate cut portions 641a, raised gate vestiges, in the recess portions 641. Referring to FIG. 10, the gate cut portions 641a overlap with the cutouts 551 of the plate member 131 in the direction parallel or substantially parallel to the center axis J1. As shown in FIG. 8, the gate cut portions 641a are positioned between the claws 633 along the circumferential direction.

Figure 11:
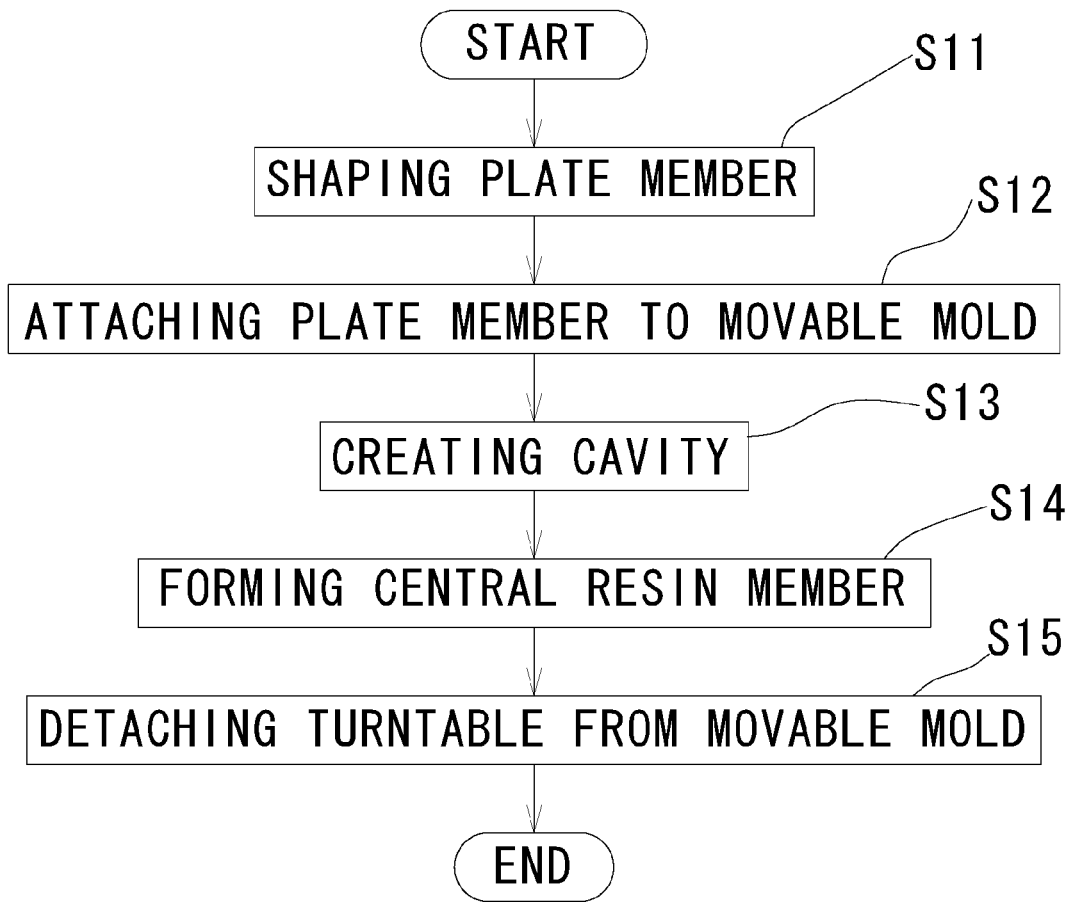
FIG. 11 is a flowchart illustrating a process for manufacturing the turntable.

Next, a process for manufacturing the turntable 13 will be described with reference to FIG. 11. A plurality of plate members 131 is first produced by a press work (step S11). The plate members 131 are stored in a specified storage unit. Within the storage unit, the cutouts 512 (see FIG. 3) of the outer peripheral edges of the plate members 131 are kept in contact with a rod-shaped member so that the circumferential positions, i.e., the circumferential orientations, of the plate members 131 can become substantially uniform. This makes it easy to attach each of the plate members 131 to the mold.

Figure 12:
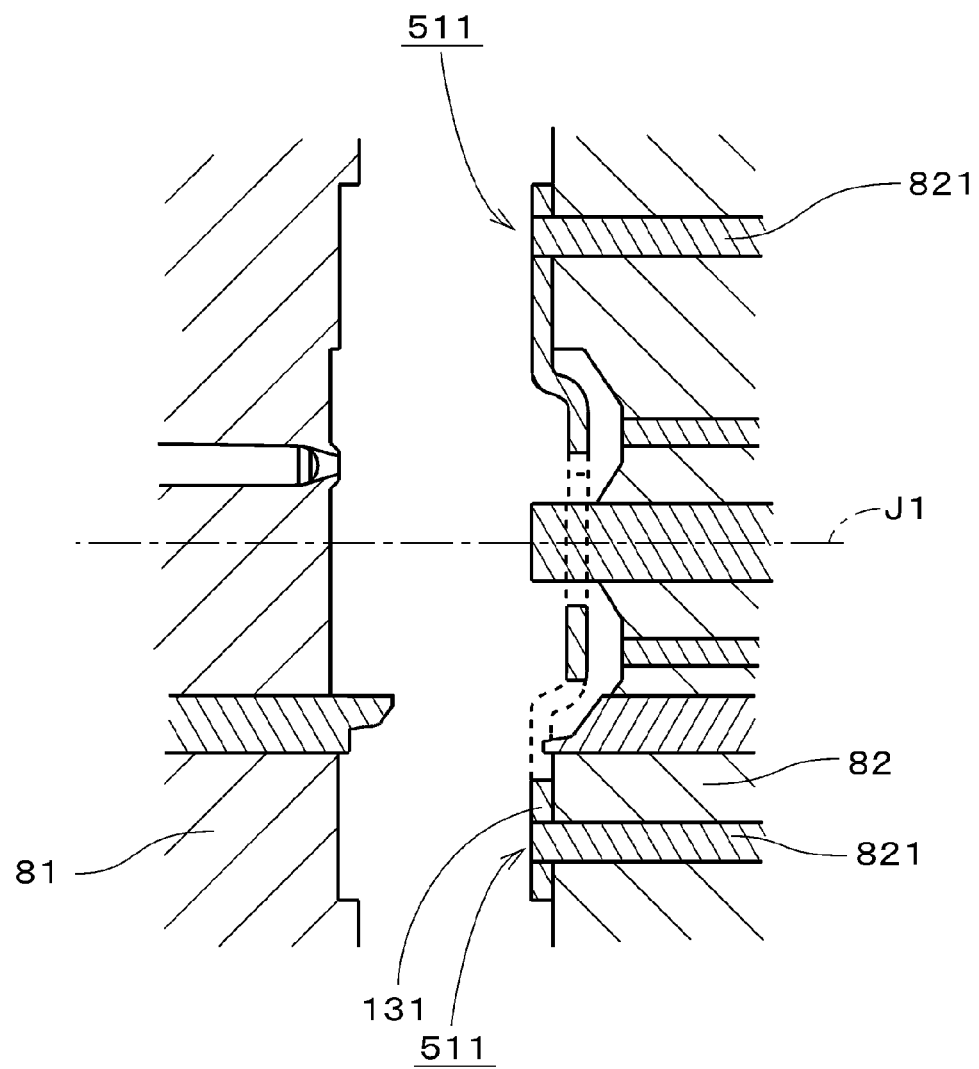
FIG. 12 is a view showing a mold and a plate member.

Then, one of the plate members 131 is picked up by a transfer mechanism and is taken out of the storage unit. As shown in FIG. 12, the upper surface of the plate member 131 is caused to face a movable mold 82 so that the center axis J1 of the plate member 131 is oriented in the horizontal direction. In this regard, the direction of the center axis J1 corresponds to the moving direction of the movable mold 82. The plate member 131 is attached to the movable mold 82 by, e.g., a magnetic action or a pneumatic attraction force in a perpendicular or substantially perpendicular relationship with the moving direction of the movable mold 82 (step S12). At this time, the positioning pins 821 of the movable mold 82 are inserted into two minute hole portions 511 of the plate member 131. The positioning pins 821 make contact with the minute hole portions 511 in the direction perpendicular or substantially perpendicular to the center axis J1, thereby fixing the position of the plate member 131 relative to the movable mold 82 in the direction perpendicular or substantially perpendicular to the center axis J1. Hereinafter, the minute hole portions 511 will be referred to as "positioning portions 511".

Figure 13:
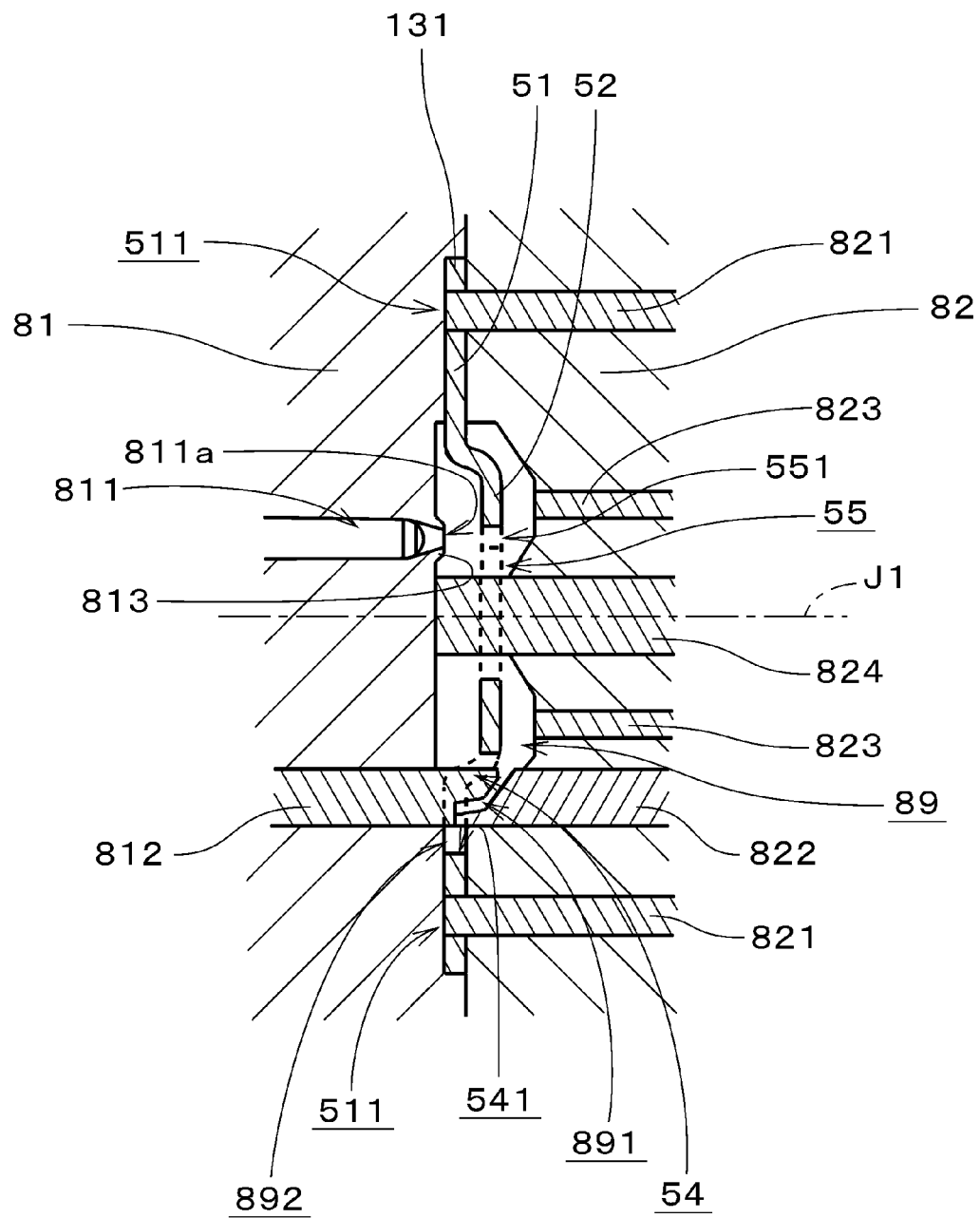
FIG. 13 is another view showing the mold and the plate member.

The movable mold 82 and the plate member 131 are moved toward a fixed mold 81 along the center axis J1. As illustrated in FIG. 13, the fixed mold 81 and the movable mold 82 are clamped together with the plate member 131 interposed therebetween. A cavity 89 is defined between the fixed mold 81 and the movable mold 82 (step S13). In the direction of the center axis J1 within the cavity 89, the position of the fixed mold 81 corresponds to the lower side of the central resin member 132 to be molded and the position of the movable mold 82 corresponds to the upper side of the central resin member 132.

The fixed mold 81 preferably includes flow paths 811 through which to feed a resin into the cavity 89 and first claw-forming parts 812 by which to form each of the claws. The first claw-forming parts 812 protrude toward the movable mold 82. Minute raised portions 813 protruding toward the central plate portion 52 are formed in the fixed mold 81 at the position corresponding to the lower portion 64 of the central resin member 132. The gates 811a of the flow paths 811 are positioned in the minute raised portions 813. The gates 811a are opposed to the cutouts 551 of the plate member 131 in the direction parallel or substantially parallel to the center axis J1.

Second claw-forming parts 822 by which to form the claws are provided in the movable mold 82. The second claw-forming parts 822 protrude toward the first claw-forming parts 812. The first claw-forming parts 812 and the second claw-forming parts 822 are respectively inserted into the openings 54 of the plate member 131. Claw-forming spaces 891 for forming the claws 633 are defined between the first and second claw-forming parts 812 and 822. In addition, the first and second claw-forming parts 812 and 822 are spaced apart from the edges 541 of the openings 54, consequently leaving resin layer formation spaces 892 to form resin layers 65 in the direction perpendicular or substantially perpendicular to the center axis J1.

In the fixed mold 81 and the plate member 131, there is no need to just accurately set the circumferential width of the positioning portions 511 and the diameter of the positioning pins 821, so long as it is possible to secure the resin layer formation spaces 892. Some tolerances are allowable. In this case, the circumferential width between the positioning pins 821 and the positioning portions 511 is smaller than the circumferential width between the first and second claw-forming parts 812 and 822 and the edges 541 of the openings 54.

Release pins 823 for detaching a molded product from the mold are provided in the movable mold 82. The release pins 823 are opposed to the central plate portion 52. A central pin 824 is inserted into the plate center hole 55. The tip end of the central pin 824 comes into contact with the fixed mold 81.

Once the fixed mold 81 and the movable mold 82 are clamped together, a resin is injected under high pressure into the cavity 89 from the gates 811a to form the central resin member 132 (step S14). At this time, the gates 811a are opposed to the cutouts 551 in the direction parallel or substantially parallel to the center axis J1. Thus, the resin is violently injected through the cutouts 551 into the space corresponding to the upper portion 63 of the central resin member 132. This makes it easy for the resin to be filled in the claw-forming spaces 891. The resin is also spread into the space corresponding to the lower portion 64 of the central resin member 132 and, therefore, fully filled in the cavity 89.

Figure 14:
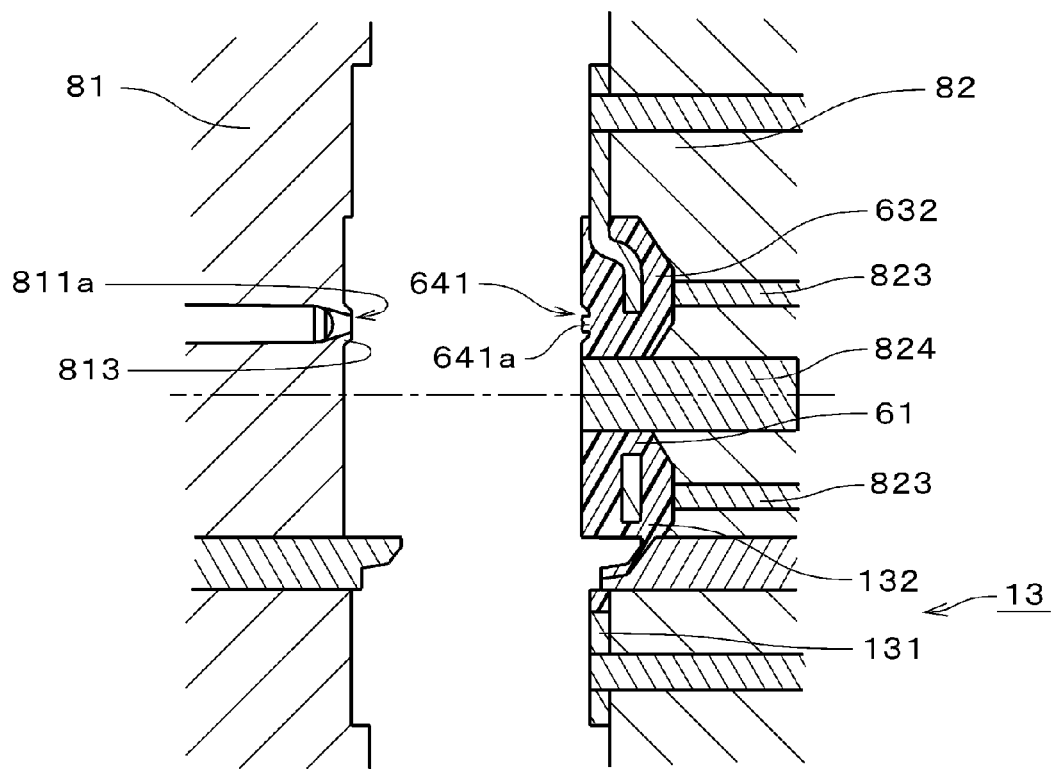
FIG. 14 is a further view showing the mold and the plate member.

If the resin is cured sufficiently, the movable mold 82 is moved away from the fixed mold 81 as illustrated in FIG. 14. Since the resinous cylinder portion 61 and the central pin 824 remain in contact with each other at this moment, the turntable 13 is moved away from the fixed mold together with the movable mold 82. Minute recess portions 641 are formed in the central resin member 132 at the positions corresponding to the minute raised portions 813 of the fixed mold 81. Gate cut portions 641a are formed within the minute recess portions 641 as the resin is cut away from the gates 811a.

Thereafter, the release pins 823 lightly press the resinous connector portion 632 at seven points (see FIG. 5), while the turntable 13 is attracted and held by the transfer mechanism. Thus, the turntable 13 is detached from the movable mold 82 (step S15).

The turntable 13 attracted and held by the transfer mechanism is brought into a specified container. After one turntable 13 has been manufactured in this manner, a new plate member 131 is taken out of the storage unit. Then, steps S12 through S15 are performed to form the central resin member 132 in the new plate member 131. In the manner stated above, a plurality of turntables 13 is manufactured one after another. The annular rubber member 133 is bonded to the plate member 131 in the subsequent step.

In the manufacturing process of the turntable 13 set forth above, the resin is violently injected and filled into the space corresponding to the upper portion 63 of the central resin member 132 through the cutouts 551. As a result, the resin is uniformly cooled and cured within the cavity 89, thereby preventing occurrence of resin sinkage in the space corresponding to the upper portion 63 of the central resin member 132. This makes it possible to provide the disk guide portion 631 of increased accuracy on the upper surface of the central resin member 132. The gate cut portions 641a are not positioned in the disk guide portion 631. Consequently, the gate cut portions 641a are prevented from affecting the shape of the disk guide portion 631.

In case where a mold has a gate through which a resin is injected into a cavity from the position corresponding to the upper portion of a central resin member, there is a need to arrange the gate at the position where the disk guide portion does not exist. This is to secure the accuracy in shape of the disk guide portion. For that reason, the degree of freedom of mold design is reduced. On the other hand, if the gate is temporarily provided at the position corresponding to the lower portion of the central resin member, the space corresponding to the upper portion of the central resin member is finally filled with the resin. As a consequence, the resin is cured more slowly in the space corresponding to the upper portion than in the space corresponding to the lower portion. Thus, resin sinkage occurs in the upper portion of the central resin member, leaving a possibility that the disk guide portion is not molded with increased accuracy. These problems are not posed in the turntable 13 according to the foregoing preferred embodiment.

In the plate member 131, the central plate portion 52 protrudes upwards from the peripheral plate portion 51. Therefore, the thickness of the central resin member 132 becomes smaller at the upper side of the plate member 131. Thanks to this feature, occurrence of resin sinkage in the upper portion 63 of the central resin member 132, particularly in the disk guide portion 631, is surely prevented even in case of the turntable 13 in which the upper surface of the central plate portion 52 is fully covered with the resin. Moreover, the central plate portion 52 and the bent portion 53 are formed to conform to the outer surface shape of the disk guide portion 631 and the resinous connector portion 632. Thanks to this feature, the thickness of the resin portion lying above the bent portion 53 and the central plate portion 52 is substantially uniform. Thus, occurrence of resin sinkage in the upper portion 63 of the central resin member 132 is prevented in a more reliable manner.

Provision of the central plate portion 52 in the plate member 131 helps secure the contact area between the central resin member 132 and the plate member 131. Since the central plate portion 52 protrudes upwards from the peripheral plate portion 51 as mentioned earlier, the central plate portion 52 is gripped by the resin at the upper and lower sides thereof. This helps increase the contact area between the central resin member 132 and the plate member 131. As a result, it is possible to prevent separation of the plate member 131 and the central resin member 132.

As shown in FIG. 8, the gate cut portions 641a are positioned between the claws 633 along the circumferential direction. In other words, the gates 811a are circumferentially positioned between the first and second claw-forming parts 812 and 822 as illustrated in FIG. 13. This makes it possible to prevent a weld line from being positioned in the portion of the disk guide portion 631 between the claws 633. As a result, it is possible to accurately form the portion of the disk guide portion 631 between the claws 633, with which the central hole 91 of the storage disk 9 makes contact. It is also possible to reduce occurrence of resin sinkage which would otherwise occur when a weld line is formed in that portion.

The central resin member 132 is designed so that the tip ends of the claws 633 can lie within the claw position holes 66. This helps reduce the force required in separating the first and second claw-forming parts 812 and 822 from the claws 633 during the injection-molding process.

In the turntable 13, the resin layers 65 are formed by providing great enough gaps between the first and second claw-forming parts 812 and 822 and the edges 541 of the openings 54 and then positively introducing the resin into the gaps. Thanks to this feature, no resin burr is generated at the inner sides of the openings 54 during the injection molding process. In addition, the first and second claw-forming parts 812 and 822 are kept out of contact with the openings 54 of the plate member 131. This makes it easy to prevent physical interference between the first and second claw-forming parts 812 and 822 and the plate member 131. As a result, it is possible to prevent wear or damage of the first and second claw-forming parts 812 and 822.

Use of the insert-molding makes it possible to manufacture the turntable 13 through a reduced number of steps and with increased accuracy. Since the plate member 131 does not require high shaping accuracy, it can be shaped by a cost-effective press work.

(Second Preferred Embodiment)

Figure 15:
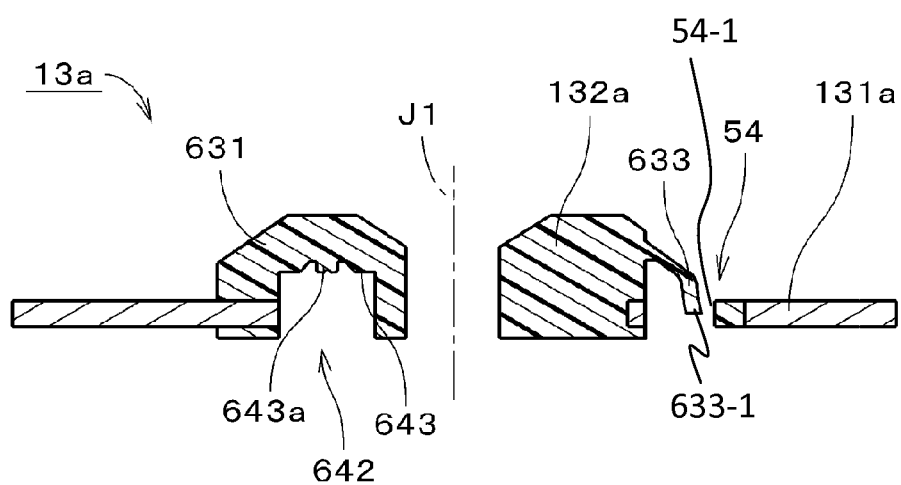
FIG. 15 is a section view showing a turntable according to a second preferred embodiment.

FIG. 15 is a section view showing a turntable according to a second preferred embodiment. The central resin member 132a of the turntable 13a preferably includes a plurality of large gate recess portions 642 arranged at an equal interval along the circumferential direction. The gate recess portions 642 are indented upwards from the lower surface of the central resin member 132a. In other words, the bottom portions of the gate recess portions 642, i.e., the ceiling surfaces 643 of the gate recess portions 642 lying at the upper side in FIG. 15, are positioned higher than the plate member 131a. As will be described later, tubular protrusions are arranged at the positions corresponding to the gate recess portions 642 within the cavity and a resin is injected into the cavity from the tip end gates of the protrusions during the process of injection-molding the central resin member 132a. Therefore, gate cut portions 643a as gate vestiges left in the injection molding process are formed on the ceiling surfaces 643 of the gate recess portions 642 of the central resin member 132a. Other shapes of the central resin member 132a remain the same as those of the central resin member 132 shown in FIG. 10.

As shown in FIG. 15, the central resin member 132b has a claw 633 with an outer tip 633-1 extended radially inside the periphery 54-1 of the opening 54.

Figure 16:
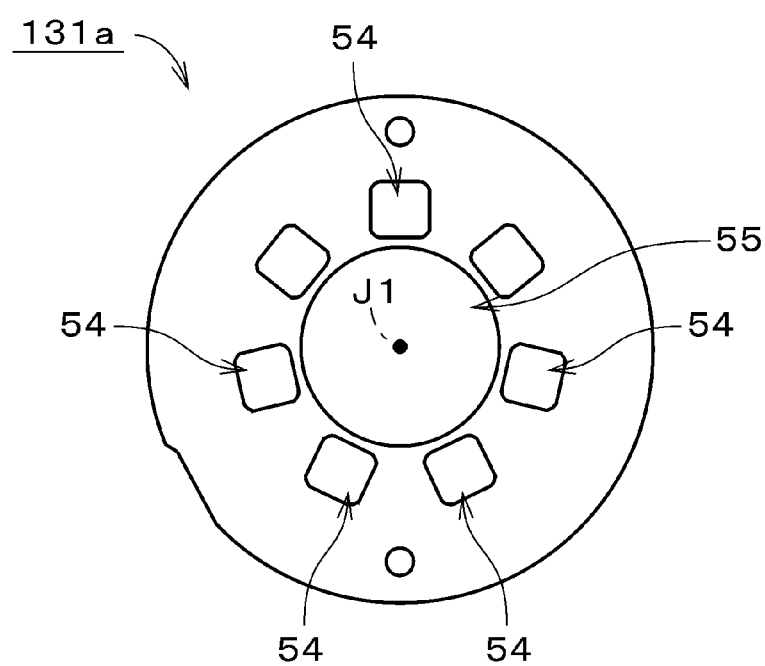
FIG. 16 is a plan view showing a plate member.

FIG. 16 is a top view of the plate member 131a. The plate member 131a has a circular shape and extends perpendicularly to the center axis J1. A large plate center hole 55 is formed at the center of the plate member 131a. The cutouts 551 of the plate member 131 shown in FIG. 3 are omitted from the plate member 131a. Seven openings 54 are defined in the periphery of the plate center hole 55 at an equal interval along the circumferential direction. As can be seen in FIG. 15, the claws 633 of the central resin member 132a are provided at the positions overlapping with the openings 54 in the direction parallel or substantially parallel to the center axis J1. Hereinafter, the same configurations as those of the turntable 13 of the first preferred embodiment will be designated by like reference characters.

Figure 17:
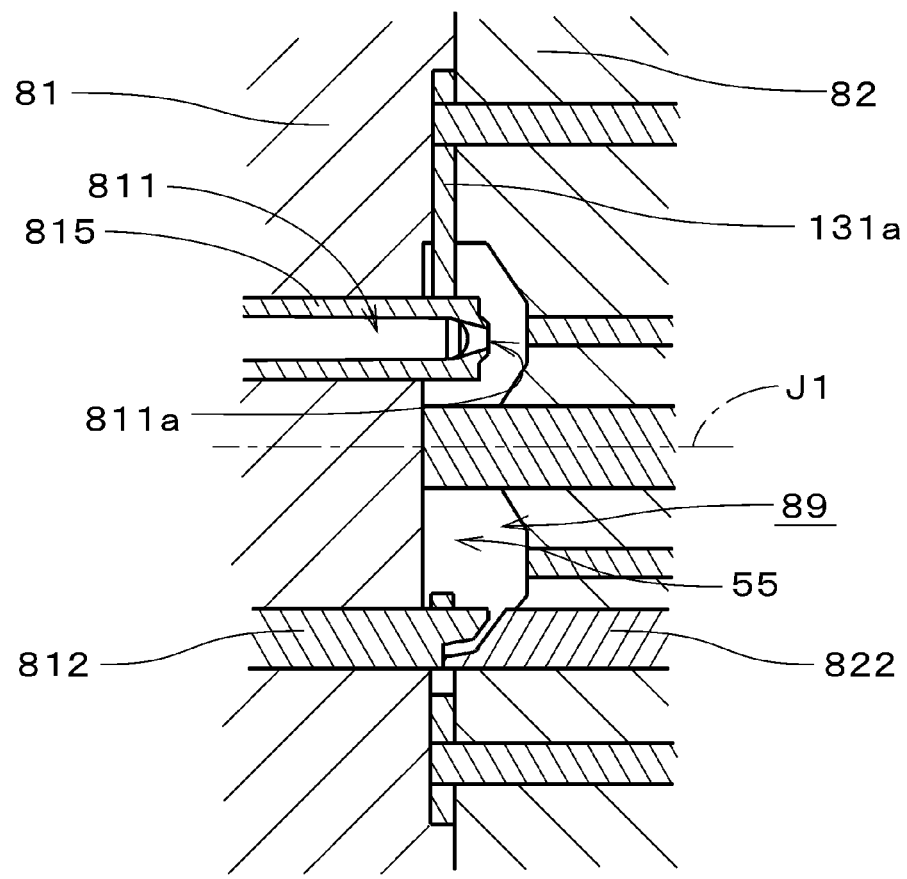
FIG. 17 is a view showing a mold and a plate member.

In the process of manufacturing the turntable 13a, a plurality of plate members 131a is shaped by a press work (step S11). Then, the plate member 131a is attached to the movable mold 82 by the transfer mechanism as shown in FIG. 12 in a state that the center axis J1 of the plate member 131a is oriented horizontally (step S12). As illustrated in FIG. 17, the fixed mold 81 and the movable mold 82 are clamped together with the plate member 131a interposed therebetween. A cavity 89 is defined between the fixed mold 81 and the movable mold 82 (step S13).

The fixed mold 81 is provided with protrusion portions 815 protruding toward the movable mold 82 in the direction parallel or substantially parallel to the center axis J1. When the fixed mold 81 and the movable mold 82 are clamped together, the protrusion portions 815 pass through the plate center hole 55 from the position corresponding to the lower surface of the central resin member 132a. Thus, the tip ends of the protrusion portions 815 are positioned higher than the plate member 131a. Flow paths 811 through which to feed a resin to the cavity 89 are defined inside the protrusion portions 815. Other structures of the fixed mold 81 remain the same as those of the fixed mold 81 shown in FIG. 12 or 14. Likewise, other structures of the movable mold 82 remain the same as those of the movable mold 82 shown in FIG. 12 or 14.

Next, a resin is injected under high pressure into the cavity 89 from the tip end gates 811a of the protrusion portions 815, thereby forming the central resin member 132a (step S14). The resin is spread from the upper side of the plate member 131a to the lower side thereof and completely filled into the cavity 89.

If the resin is cured, the movable mold 82 is detached from the fixed mold 81 together with the turntable 13a. The turntable 13a is attracted and held by the transfer mechanism so that it can be separated from the movable mold 82 (step S15). As described earlier with reference to FIG. 15, gate recess portions 642 are formed in the central resin member 132a at the positions corresponding to the protrusion portions 815 shown in FIG. 17.

Figure 18:
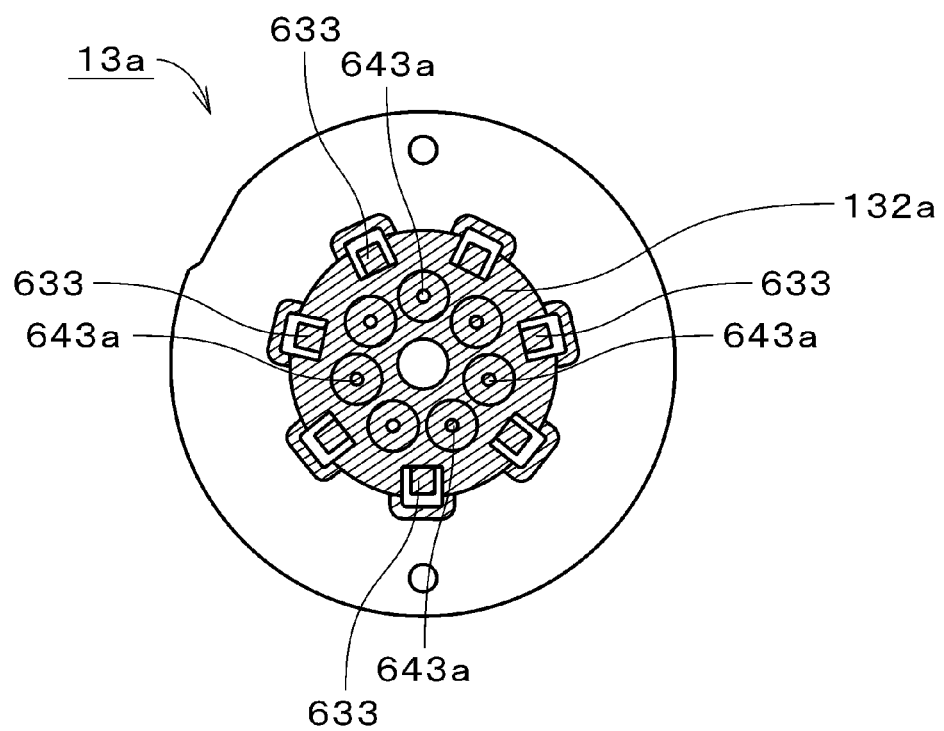
FIG. 18 is a bottom view of the turntable.

FIG. 18 is a bottom view of the turntable 13a. The central resin member 132a is hatched in FIG. 18. In the central resin member 132a, gate cut portions 643a are positioned between the claws 633 along the circumferential direction. In other words, the gates 811a are circumferentially positioned between the first and second claw-forming parts 812 and 822 as illustrated in FIG. 17. This makes it possible to prevent a weld line from being positioned in the portion of the disk guide portion 631 between the claws 633. As a result, it is possible to accurately form the portion of the disk guide portion 631 between the claws 633, with which the central hole 91 of the storage disk 9 makes contact.

In the second preferred embodiment, the resin is violently injected and filled into the space corresponding to the upper portion 63 of the central resin member 132a. As in the first preferred embodiment, this helps prevent occurrence of resin sinkage, making it possible to obtain the disk guide portion 631 with increased accuracy. Since the gate cut portions 641a are not positioned in the disk guide portion 631, it becomes possible to form the disk guide portion 631 with increased accuracy. Seeing that the gates 811a of the protrusion portions 815 are circumferentially arranged at an equal interval, it is possible to uniformly fill the resin into the cavity 89. It is not always necessary for the gates 811a to be arranged at an equal interval. For example, plural groups of gates 811a may be arranged at an equal interval along the circumferential direction.

Figure 19:
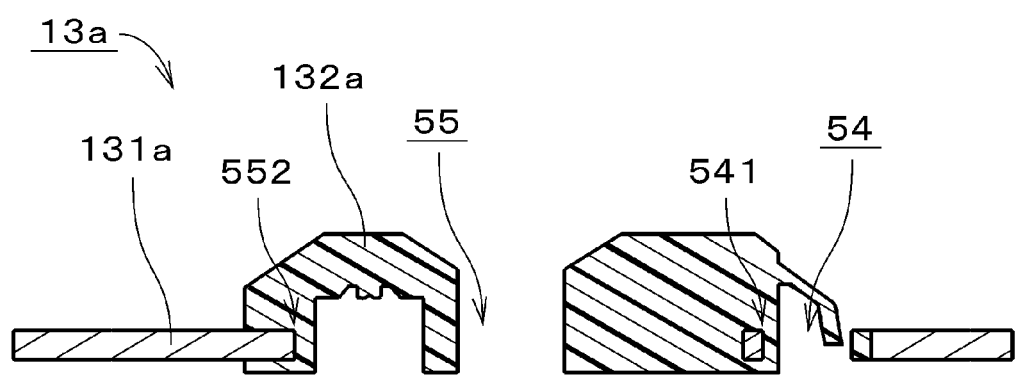
FIG. 19 is a section view showing a modified example of the turntable.

In the second preferred embodiment, it is preferred that, as shown in FIG. 19, the radial inner portions of the edge 552 of the plate center hole 55 and the edges 541 of the openings 54 are covered with the central resin member 132a. In other words, it is preferred that the portions of the edges of the plate member 131a overlapping with the central resin member 132a in the vertical direction are all covered with the central resin member 132a. However, the portions of the edges of the plate member 131a making contact with the fixed mold 81 or the movable mold 82 at the time when the molds 81 and 82 are not clamped together are exposed from the resin. In the process of injection-molding the central resin member 132a, the protrusion portion 815 shown in FIG. 17 and the first and second claw-forming parts 812 and 822 are kept out of contact with the edge of the plate member 131a in the direction perpendicular or substantially perpendicular to the center axis J1. This makes it possible to prevent wear or damage of the protrusion portion 815 and the first and second claw-forming parts 812 and 822, leading to a prolonged lifespan thereof.

(Third Preferred Embodiment)

Figure 20:
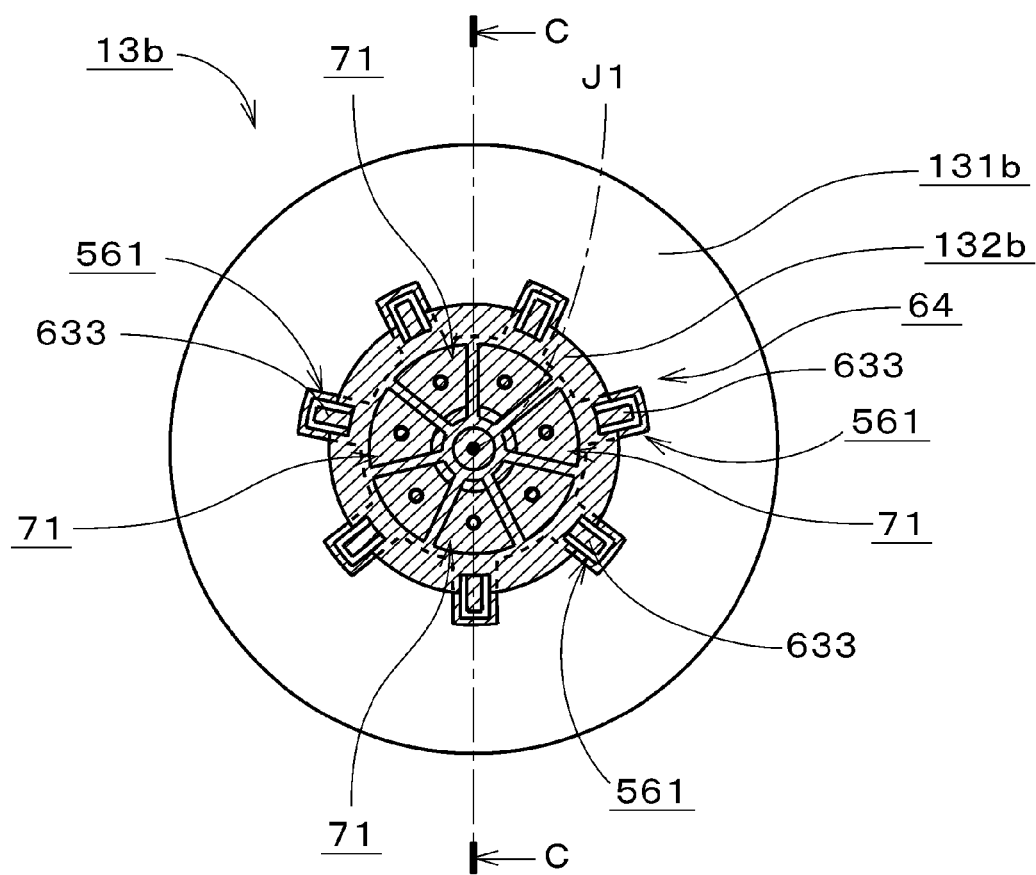
FIG. 20 is a bottom view showing a turntable according to a third preferred embodiment.

FIG. 20 is a bottom view showing a turntable 13b according to a third preferred embodiment. The central resin member 132b is provided with a plurality of fan-shaped gate recess portions 71 extending radially outwards when seen from below. The gate recess portions 71 are arranged at an equal interval along the circumferential direction. Other shapes of the central resin member 132b remain the same as those of the central resin member 132a of the second preferred embodiment.

Figure 21:
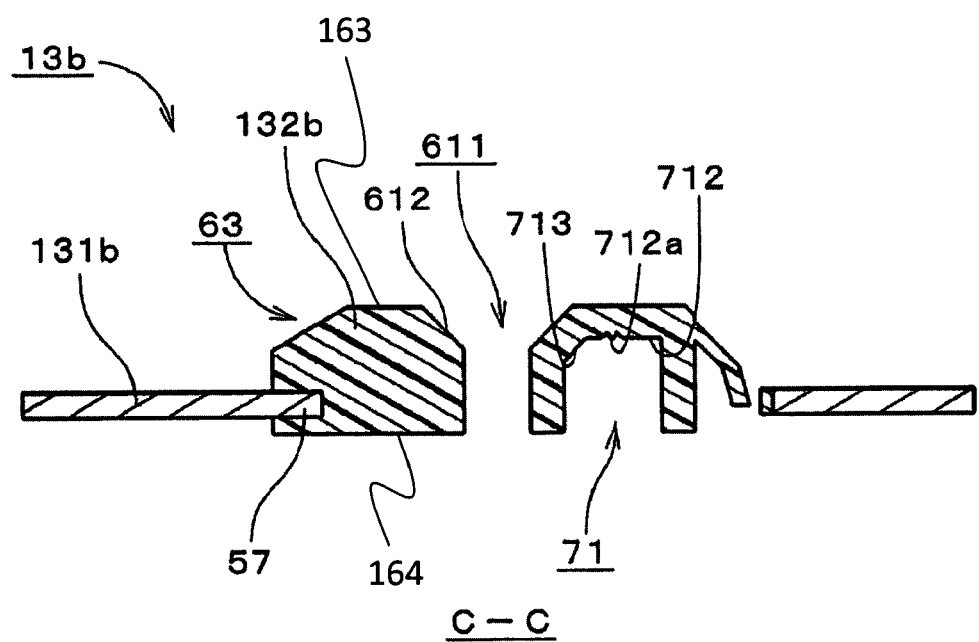
FIG. 21 is a section view of the turntable.

FIG. 21 is a section view of the turntable 13b taken along line C-C in FIG. 20. The central resin member 132 has an upper surface 163 and a lower surface 164. The ceiling surfaces 712 of the gate recess portions 71 are positioned higher than the plate member 131b. Gate cut portions 712a are arranged on the ceiling surfaces 712. At the radial inner side of each of the ceiling surfaces 712, there is provided an oblique surface 713 inclined radially inwards and downwards. As in the first preferred embodiment, a central slanting surface 612 is formed above the central resin through-hole 611 of the central resin member 132b. The thickness of the portion lying between the oblique surface 713 and the central slanting surface 612 is substantially uniform.

Figure 22:
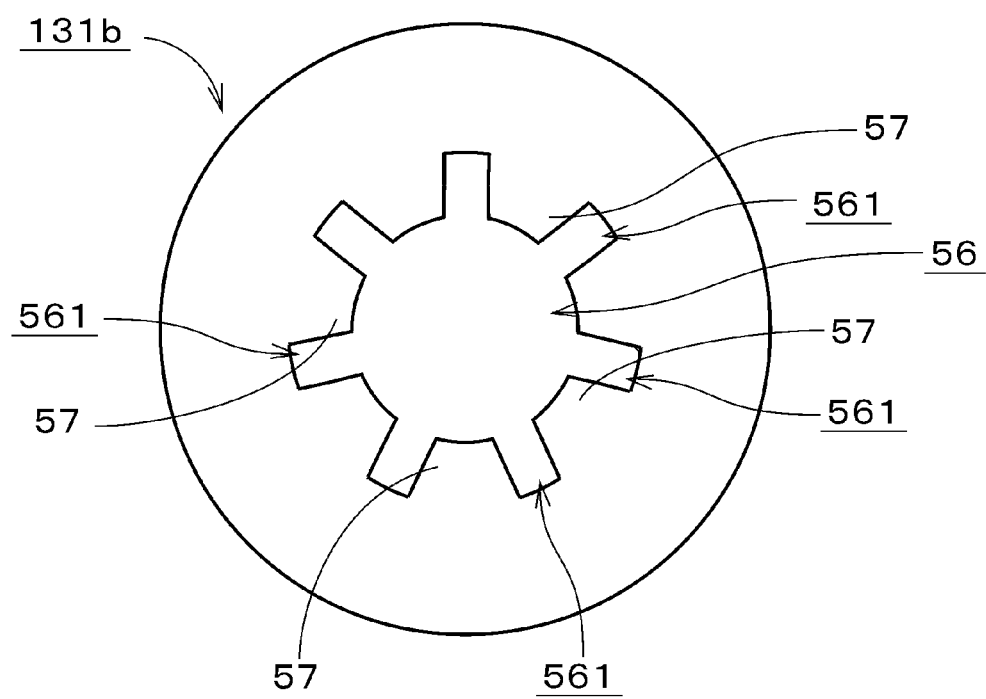
FIG. 22 is a plan view showing a plate member.

FIG. 22 is a top view of the plate member 131b. At the center of the plate member 131b, there is defined a plate center hole 56 shaped as if the plate center hole 55 and the openings 54 shown in FIG. 16 are joined together. The plate center hole 56 includes a plurality of radially outwardly extending cutout-shaped portions 561 corresponding to the openings 54. Hereinafter, the cutout-shaped portions 561 will be referred to as "cutout portions 561". Jut portions 57 extending radially inwards are positioned between the cutout portions 561. Other shapes of the plate member 131b remain the same as those of the plate member 131a of the second preferred embodiment. Referring back to FIG. 20, the claws 633 of the central resin member 132b are provided at the positions overlapping with the cutout portions 561 in the direction parallel or substantially parallel to the center axis J1.

Figure 23:
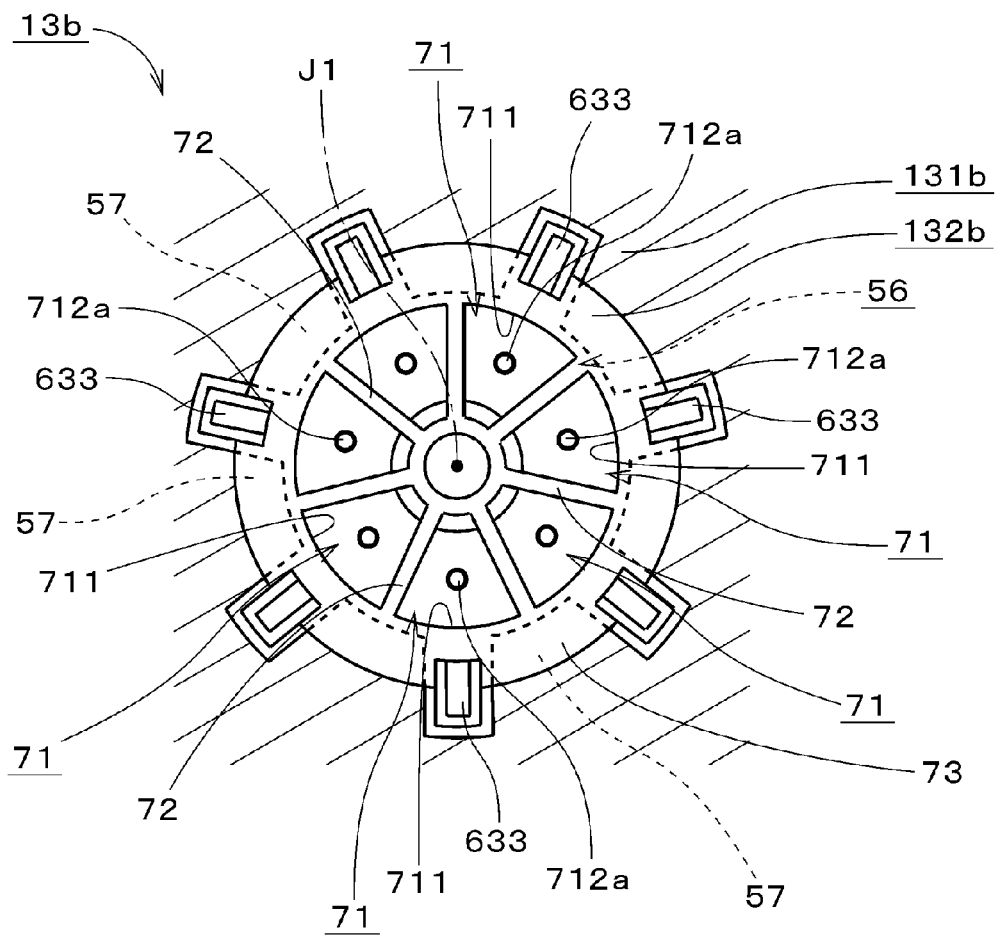
FIG. 23 is a bottom view of the turntable.

FIG. 23 is an enlarged bottom view showing the central resin member 132b and its vicinities. The plate member 131b is hatched in FIG. 23. The gate recess portions 71 are positioned radially inwards of the claws 633 within the plate center hole 56. When the turntable 13b is seen from below, the gate cut portions 712a are positioned between the center axis J1 and the claws 633 in the radial direction. A radially extending rib 72 is arranged between two circumferentially-adjoining gate recess portions 71. The thickness of the rib 72 is far smaller than the circumferential width of the gate recess portions 71. An annular outer peripheral portion 73 concentric with the center axis J1 is provided between the gate recess portions 71 and the claws 633.

In the gate recess portions 71, the radial outer surface 711, namely the inner surface of the outer peripheral portion 73, constitutes a portion of the cylindrical surface coaxial or substantially coaxial with the center axis J1. As shown in FIGS. 21 and 23, the radial inner ends of the jut portions 57 are covered with the central resin member 132b. Thus, the plate member 131b is fixed to the central resin member 132b.

The process for manufacturing the turntable 13b is substantially the same as the process of the second preferred embodiment. First, one of the plate members 131b shaped by a press work is attached to the movable mold 82 shown in FIG. 24. Then, the movable mold 82 and the fixed mold 81 are clamped together to create a cavity 89 therebetween (see steps S11 through S13 in FIG. 11). Essential structures of the movable mold 82 and the fixed mold 81 remain the same as those of the movable mold 82 and the fixed mold 81 shown in FIG. 17.

Figure 24:
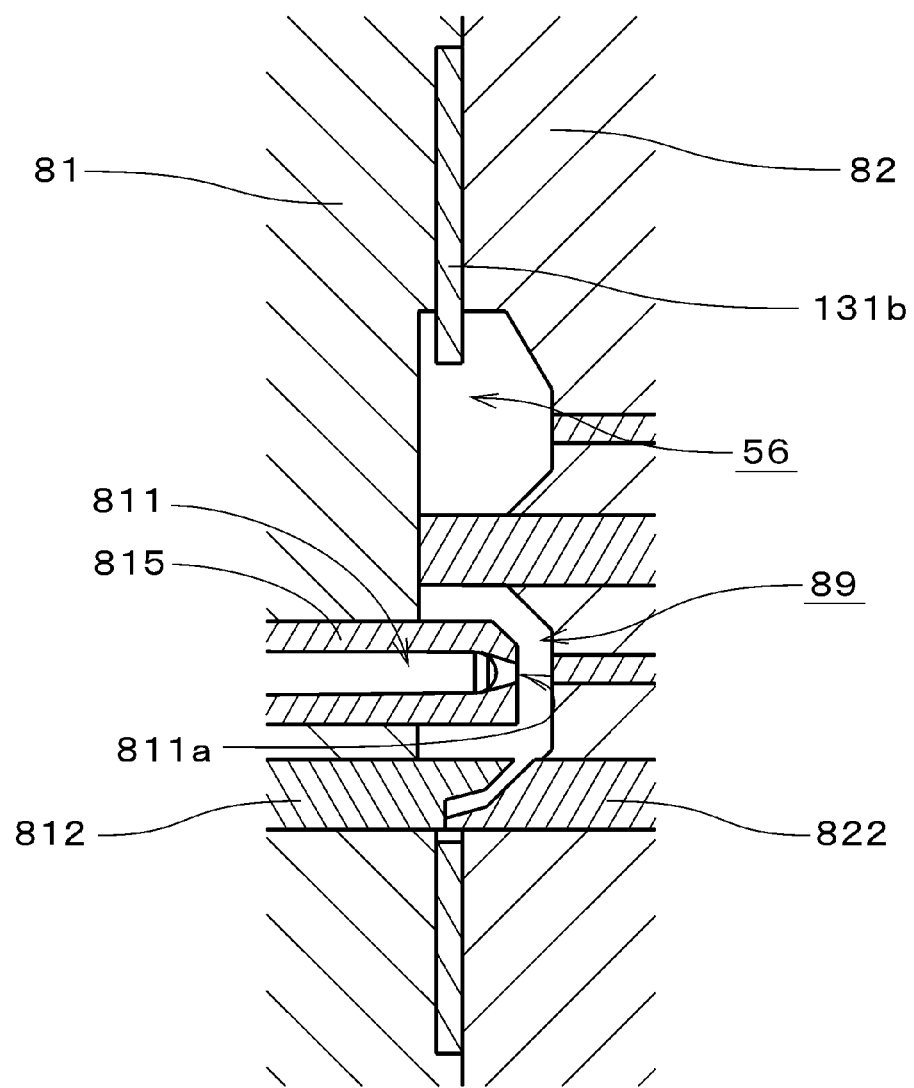
FIG. 24 is a view showing a mold and a plate member.

When the movable mold 82 and the fixed mold 81 are clamped together, the tip ends of the protrusion portions 815 of the fixed mold 81 pass through the plate center hole 56 from the positions corresponding to the lower surface of the central resin member 132b and protrude into the right space of the plate member 131b shown in FIG. 24, namely the space corresponding to the upper portion 63 of the central resin member 132b shown in FIG. 21. The protrusion portions 815 are arranged at an equal interval along the circumferential direction. The first and second claw-forming parts 812 and 822 are arranged radially outwards of the protrusion portions 815. The protrusion portions 815 and the first and second claw-forming parts 812 and 822 are kept out of contact with the plate member 131b in the direction perpendicular or substantially perpendicular to the moving direction of the movable mold 82.

A resin under pressure is injected from the tip end gates 811a of the protrusion portions 815 through the flow paths 811, thereby forming the central resin member 132b (step S14). Then, the turntable 13b is detached from the movable mold 82 (step S15).

In the third preferred embodiment, occurrence of resin sinkage in the upper portion 63 of the central resin member 132b is prevented because the resin is violently filled into the space corresponding to the upper portion 63 of the central resin member 132b. Since the gates 811a are arranged along the circumferential direction, it is possible to uniformly fill the resin into the cavity 89. Provision of the gate recess portions 71 within the plate center hole 56 makes it easy to increase the size of the gate recess portions 71. Provision of the cutout portions 561 makes it possible to increase the minimum diameter of the plate center hole 56, thus making it possible to further increase the size of the gate recess portions 71.

The thickness of the resin existing between the oblique surfaces 713 of the gate recess portions 71 and the central slanting surface 612 is made uniform, thereby preventing occurrence of resin sinkage in the central slanting surface 612 which will make contact with the guide portion of the clamper 122. This enhances the clamping reliability of the storage disk 9. Since the gate recess portions 71 have a fan shape, it is possible to greatly reduce the amount of resin required in forming the central resin member 132b. Inasmuch as the radial outer surfaces 711 of the gate recess portions 71 are formed as a portion of the cylindrical surface, the thickness of the outer peripheral portion 73 of the central resin member 132b can be made substantially uniform. This helps prevent occurrence of resin sinkage in the outer peripheral portion 73.

Provision of the ribs 72 in the central resin member 132b helps secure the strength of the central resin member 132b. Since the ribs 72 have a reduced thickness, it is possible to suppress occurrence of resin sinkage at the positions where the outer peripheral portion 73 is joined to the ribs 72. No weld line is formed in the claws 633 because the gate cut portions 712a are positioned radially inwards of the claws 633. This helps prevent reduction in the claw strength. As set forth above, the positions of the gates 811a in the turntable 13b during the injection molding process are set suitable for the case where the claws 633 require increased strength. The protrusion portions 815 as expensive mold components are kept out of contact with the plate member 131b, which makes it possible to prevent wear or damage of the protrusion portions 815 and to prolong the lifespan thereof. Similarly, the first and second claw-forming parts 812 and 822 are kept out of contact with the plate member 131b, which assists in increasing the lifespan thereof.

Figure 25:
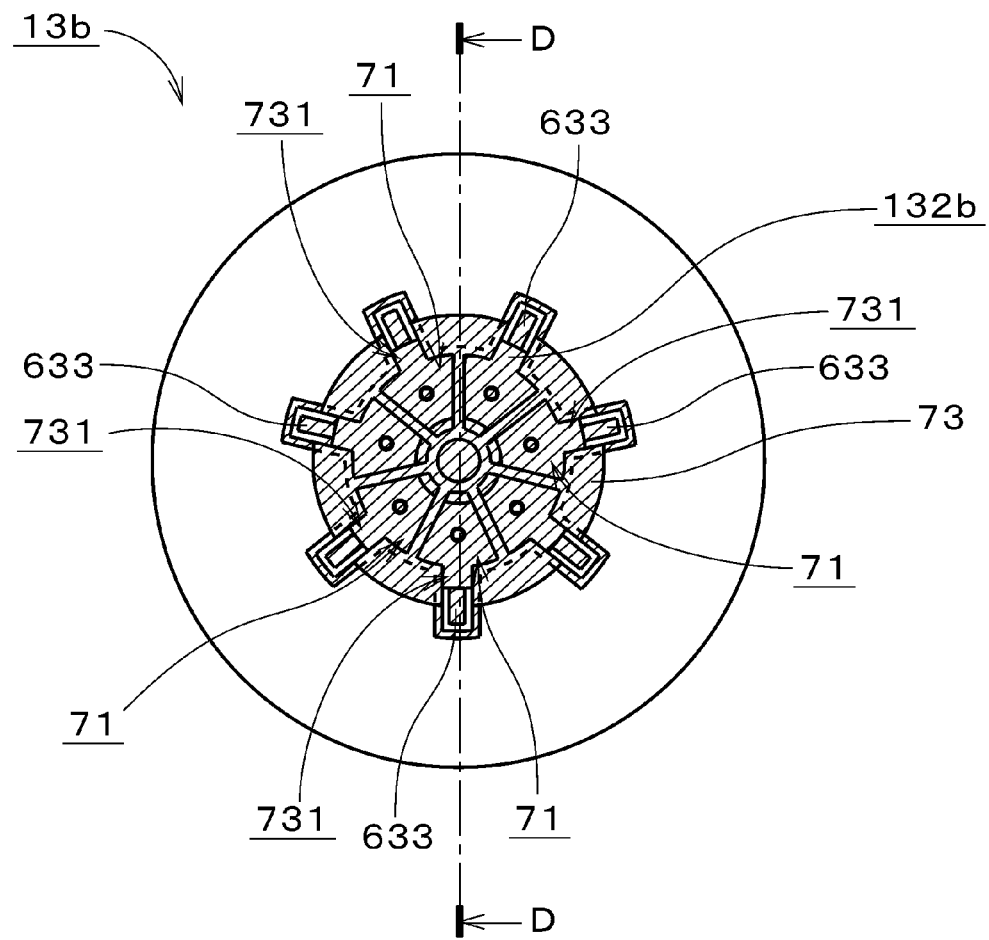
FIG. 25 is a bottom view showing a modified example of the turntable.
Figure 26:
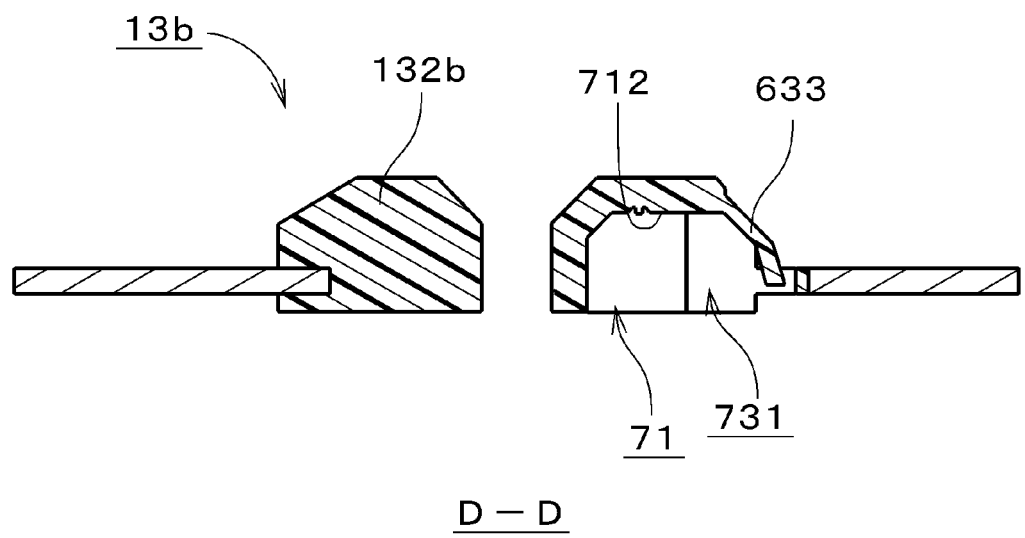
FIG. 26 is a section view of the turntable.

FIG. 25 is a bottom view showing a modified example of the turntable. FIG. 26 is a section view of the turntable 13b taken along line D-D in FIG. 25. As shown in FIG. 25, groove portions 731 extending from the gate recess portions 71 toward the claws 633 are provided in the outer peripheral portion 73 of the central resin member 132b. Referring to FIG. 26, the ceiling surfaces 712 of the gate recess portions 71 and the radial inner surfaces of the claws 633 extend continuously through the groove portions 731. Other shapes of the turntable 13b remain the same as those of the turntable 13b of the third preferred embodiment. Provision of the groove portions 731 in the turntable 13b makes it possible to further reduce the amount of resin used in forming the central resin member 132b.

While certain preferred embodiments of the present invention have been described hereinabove, the present invention shall not be limited to these embodiments but may be modified in many different forms. For example, hole portions to be opposed to the gates 811a in the direction parallel or substantially parallel to the center axis J1 may be provided in the central plate portion 52. In this case, the gate cut portions 641a are formed in the central resin member 132 at the positions overlapping with the hole portions in the direction parallel or substantially parallel to the center axis J1.

There is no need for the upper surface of the central plate portion 52 to be fully covered with the resinous connector portion 632. A turntable of other shape may be employed, as long as the resinous cylinder portion 61 and the disk guide portion 631 are connected to each other by the resinous connector portion 632 at least in some regions on the upper surface of the central plate portion 52. Even in such an instance, occurrence of resin sinkage in the disk guide portion 631 is prevented because the central plate portion 52 of the plate member 131 is positioned higher than the peripheral plate portion 51. In the central resin member 132, the upper portion 63 and the lower portion 64 arranged above and below the central plate portion 52 are substantially equal to each other in thickness. However, the upper portion 63 and the lower portion 64 may differ in thickness from each other in case where deformation such as resin sinkage or the like occurs in the upper portion 63 and the lower portion 64.

In the third preferred embodiment, the gate recess portions 71 may be positioned between the claws 633 along the circumferential direction. In this case, the positions of the gate cut portions 712a, namely the positions of the gates 811a during the injection molding process, are set to lie between the claws 633 along the circumferential direction. This prevents any weld line from being positioned in the area of the disk guide portion 631 between the claws 633. In addition, it is possible to reduce occurrence of resin sinkage in that area. To the contrary, the gate recess portions 642 may be positioned between the center axis J1 and the claws 633 in the second preferred embodiment.

In the preferred embodiments described above, the number of the positioning portions 511 may be two or other numbers greater than two. Cutout-shaped positioning portions may be employed in place of the hole-shaped positioning portions 511. The number of the claws 633 may be changed to two or other numbers greater than two. Preferably, the number of the claws 633 is set equal to five through seven in order to reduce the influence of damage of one of the claws 633 on the remaining claws 633. In case where the number of the claws 633 is equal to, e.g., five, in the preferred embodiments described above, the positioning portions may be provided in the central plate portion 52.

In the preferred embodiments described above, when injection-molding the central resin member, the fixed mold 81 and the movable mold 82 may be clamped together in a state that the plate member is attached to the fixed mold 81. The movable mold 82 may be provided with a release pin that makes contact with the radial outer area of the plate member. In case where the fixed mold 81 is provided with a mechanism for detaching the turntable, the fixed mold 81 and the movable mold 82 may be separated from each other with the turntable held in the fixed mold 81.

In the preferred embodiments described above, the fixed mold 81 may be provided at the position corresponding to the upper side of the central resin member 132 with the movable mold 82 provided at the position corresponding to the lower side thereof. In this case, the gates 811a are provided in the movable mold 82. In the second and third preferred embodiments, a protrusion portion protruding toward the fixed mold 81 is formed in the movable mold 82.

Figure 27:
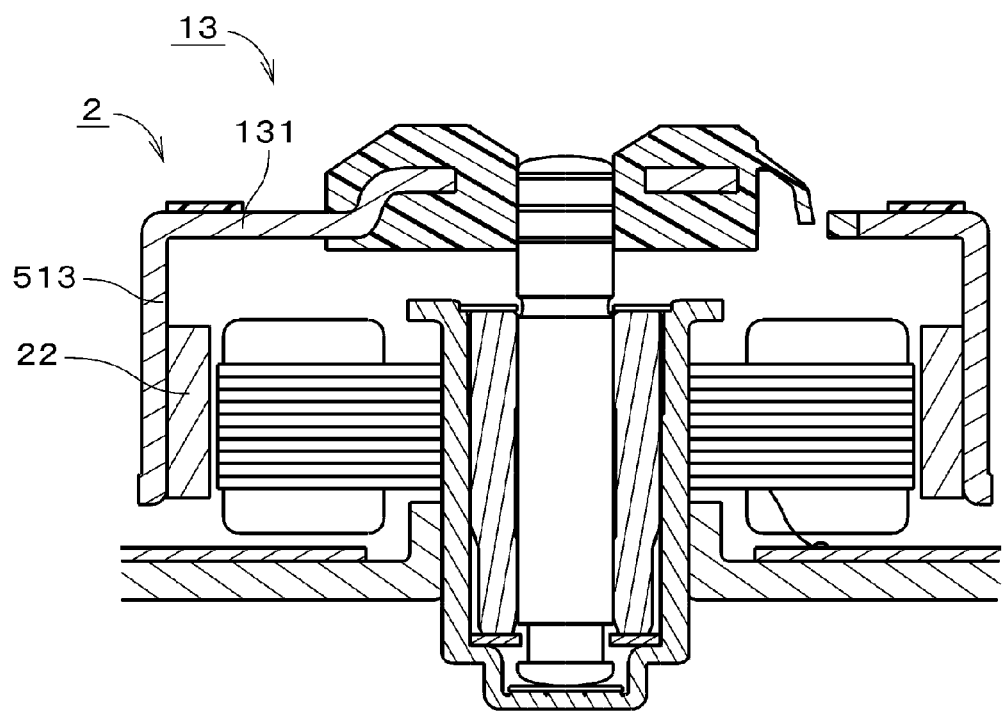
FIG. 27 is a section view of a motor illustrating another example of the plate member.

In the preferred embodiments described above, the cylinder portion 513 corresponding to the cup member 21 shown in FIG. 2 may be provided in the outer peripheral portion of the plate member 131 as shown in FIG. 27, whereby the turntable 13 may be arranged at the upper end of the rotary unit 2. The rotor magnet 22 is arranged inside the cylinder portion 513. The motor 1 may be mounted to other storage disk drive apparatuses such as a hard disk drive and the like.

Industrial Applicability

The present invention finds its application in various kinds of storage disk drive apparatuses.

While various preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A turntable for storage disk drive apparatuses, comprising:
   a plate member made of a ferromagnetic material, having an through hole with a periphery; and
   a central resin member integrally arranged at the center of the plate member and formed by injection-molding a resin,
   wherein the central resin member has an upper surface and a lower surface, the upper surface including a disk guide portion to guide a central hole of a disk, and the lower surface including a plurality of gate recess portions indented upwards,
   wherein the lower surface at the gate recess portions includes ceiling surfaces positioned higher than the plate member, the ceiling surfaces including a plurality of gate cut portions formed in an injection molding process,
   wherein the central resin member has a claw with an outer tip extended radially inside the periphery of the through hole.

2. The turntable of claim 1, wherein the gate recess portions are arranged in a circumferential direction about a center axis of the central resin member.

3. The turntable of claim 2, wherein each of the gate recess portions includes a radial outer surface forming a portion of a cylindrical surface concentric with the center axis.

4. The turntable of claim 3, wherein the area lying between the gate recess portions in the circumferential direction is a rib.

5. The turntable of claim 2, wherein the central resin member includes a central resin through-hole extending in a vertical direction, the central resin through-hole including an upper portion having a central slanting surface inclined radially inwards and downwards, each of the gate recess portions including an oblique surface defined radially inwards of each of the ceiling surfaces and inclined radially inwards and downwards.

6. The turntable of claim 1, wherein the central resin member includes an upper portion and a plurality of claws extending downwards from the outer periphery of the upper portion.

7. The turntable of claim 1, wherein an upper surface of a central portion of the plate member is fully covered with the central resin member.

8. A motor comprising:
   a stationary unit;
   a bearing mechanism;
   a rotary unit supported by the bearing mechanism to be rotatable with respect to the stationary unit; and
   the turntable of claim 1 provided at the upper end of the rotary unit.

9. A storage disk drive apparatus comprising:
   the motor of claim 8 arranged to rotate a storage disk;
   a clamper arranged to clamp the storage disk against the turntable, the clamper including a clamp magnet arranged to attract the plate member from above;
   an access unit arranged to perform a task of reading information from the storage disk and/or a task of writing information on the storage disk; and
   a housing arranged to accommodate the motor and the access unit.

10. A turntable for storage disk drive apparatuses, comprising:
    a plate member made of a ferromagnetic material; and
    a central resin member integrally arranged at the center of the plate member and formed by injection-molding a resin,
    wherein the central resin member has an upper surface and a lower surface, the upper surface including a disk guide portion to guide a central hole of a disk, and the lower surface including a plurality of gate recess portions indented upwards,
    wherein the lower surface at the gate recess portions includes ceiling surfaces positioned higher than the plate member, the ceiling surfaces including a plurality of gate cut portions formed in an injection molding process,
    wherein the gate recess portions are arranged in a circumferential direction about a center axis of the central resin member,
    wherein the plate member includes a plate center hole positioned at the center thereof, the gate recess portions being positioned in the plate center hole.

11. A turntable for storage disk drive apparatuses, comprising:
    a plate member made of a ferromagnetic material; and
    a central resin member arranged at the center of the plate member and formed by injection-molding a resin,
    wherein the central resin member includes a disk guide portion provided on an upper surface of the central resin member to guide a central hole of a disk and a plurality of gate cut portions formed on a lower surface of the central resin member, and the plate member includes hole portions or cutout portions formed at the positions overlapping with the gate cut portions in the direction parallel or substantially parallel to the center axis.

12. The turntable of claim 11, wherein the central resin member includes an upper portion and a plurality of claws extending downwards from the outer periphery of the upper portion.

13. The turntable of claim 12, wherein the gate cut portions are positioned between the claws in a circumferential direction.

14. The turntable of claim 12, wherein each of the gate cut portions is positioned between the center axis and the claws when seen from below.

15. The turntable of claim 11, wherein an upper surface of a central portion of the plate member is fully covered with the central resin member.

16. A motor comprising:
    a stationary unit;
    a bearing mechanism;
    a rotary unit supported by the bearing mechanism to be rotatable with respect to the stationary unit; and
    the turntable of claim 11 provided at the upper end of the rotary unit.

17. A storage disk drive apparatus comprising:
    the motor of claim 16 arranged to rotate a storage disk;
    a clamper arranged to clamp the storage disk against the turntable, the clamper including a clamp magnet arranged to attract the plate member from above;
    an access unit arranged to perform a task of reading information from the storage disk and/or a task of writing information on the storage disk; and
    a housing arranged to accommodate the motor and the access unit.

18. A method for manufacturing a turntable for storage disk drive apparatuses, which comprises the steps of:
   a) attaching a plate member made a ferromagnetic material to a movable mold or a fixed mold in a posture perpendicular or substantially perpendicular to the moving direction of the movable mold;
   b) defining a cavity between the movable mold and the fixed mold by clamping the movable mold and the fixed mold together; and
   c) forming a central resin member at the center of the plate member by injecting a resin into the cavity from a gate provided in one of the movable mold and the fixed mold,
   wherein the position of the mold in which the gate is provided corresponds to the lower side of the central resin member while the position of the other mold corresponds to the upper side of the central resin member; the central resin member includes a disk guide portion formed on an upper surface thereof to guide a central hole of a disk; the mold in which the gate is provided includes a protrusion portion protruding toward the other mold in the direction parallel or substantially parallel to the moving direction of the movable mold, the gate being provided at the tip end of the protrusion portion, the tip end of the protrusion portion passing through a center hole of the plate member in step b).

19. The method of claim 18, wherein, in step b), the plate member and the protrusion portion are kept out of contact with each other in the direction perpendicular or substantially perpendicular to the moving direction of the movable mold.

\* \* \* \* \*